(12) United States Patent
Duprez

(10) Patent No.: US 11,964,394 B2
(45) Date of Patent: Apr. 23, 2024

(54) COORDINATE POSITIONING MACHINE

(71) Applicant: RENISHAW PLC, Wotton-under-Edge (GB)

(72) Inventor: Julius Duprez, Pommeuse (FR)

(73) Assignee: RENISHAW PLC, Wotton-under-Edge (GB)

( * ) Notice: Subject to any disclaimer, the term of this patent is extended or adjusted under 35 U.S.C. 154(b) by 739 days.

(21) Appl. No.: 16/967,043

(22) PCT Filed: Feb. 25, 2019

(86) PCT No.: PCT/GB2019/050507
§ 371 (c)(1),
(2) Date: Aug. 3, 2020

(87) PCT Pub. No.: WO2019/162697
PCT Pub. Date: Aug. 29, 2019

(65) Prior Publication Data
US 2021/0039259 A1 Feb. 11, 2021

(30) Foreign Application Priority Data
Feb. 26, 2018 (EP) ..................................... 18305200

(51) Int. Cl.
*B25J 9/16* (2006.01)
*G05B 19/402* (2006.01)

(52) U.S. Cl.
CPC .......... *B25J 9/1692* (2013.01); *G05B 19/402* (2013.01); *G05B 2219/39015* (2013.01); *G05B 2219/39026* (2013.01)

(58) Field of Classification Search
CPC ...... B25J 9/1692; G01B 21/042; G01B 5/008; G05B 19/402; G05B 2219/39015;
(Continued)

(56) References Cited

U.S. PATENT DOCUMENTS 5,297,238 A 3/1994 Wang et al.
5,649,368 A 7/1997 Herzog et al.
(Continued)

FOREIGN PATENT DOCUMENTS

CN 105408723 A 3/2016
CN 106514651 A 3/2017
(Continued)

OTHER PUBLICATIONS

Goswami et al., "Identifying Robot Parameters Using Partial Pose Information", Oct. 1993, IEEE Control Systems, vol. 13, No. 5, pp. 6-14 (Year: 1993).*
(Continued)

*Primary Examiner* — Spencer D Patton
(74) *Attorney, Agent, or Firm* — Oliff PLC

(57) ABSTRACT

A method of calibrating a coordinate positioning machine is described. The machine is controlled into a pivot pose in which a target point associated with a moveable part of the machine and a pivot point associated with a fixed part of the machine are separated from one another by a known separation. An error value for that pose is determined based on the known separation and a separation expected for that pose from the existing model parameters of the machine. The machine is controlled into a plurality of different target poses, and for each target pose a separation between the target point and the pivot point is measured and an error value for that pose is determined based on the measured separation and a separation expected for that pose from the existing model parameters.

17 Claims, 27 Drawing Sheets

(58) Field of Classification Search
CPC ........... G05B 2219/39026; G05B 2219/27101;
G05B 2219/37123; G05B 2219/39034;
G05B 2219/39013; G05B 2219/39017;
G05B 2219/39018; G05B 2219/39019;
G05B 2219/39021; G05B 2219/39022
See application file for complete search history.

(56) References Cited

U.S. PATENT DOCUMENTS

| | | | |
|---|---|---|---|
| 6,249,985 | B1 | 6/2001 | Piko et al. |
| 6,681,495 | B2 | 1/2004 | Masayuki et al. |
| 6,772,619 | B2 | 8/2004 | Nashiki et al. |
| 9,903,173 | B1 | 2/2018 | Nault et al. |
| 10,035,268 | B2 | 7/2018 | Murata |
| 2003/0056566 | A1 | 3/2003 | Nashiki et al. |
| 2004/0003647 | A1 | 1/2004 | Nashiki et al. |
| 2004/0083830 | A1 | 5/2004 | Nashiki et al. |
| 2007/0168100 | A1 | 7/2007 | Danko |
| 2008/0234863 | A1 | 9/2008 | Pagel et al. |
| 2011/0046782 | A1* | 2/2011 | Fixell ............... B25J 9/1692 700/251 |
| 2013/0253871 | A1* | 9/2013 | Gray ............... B23Q 17/2233 702/95 |

FOREIGN PATENT DOCUMENTS

| | | |
|---|---|---|
| DE | 3504464 C1 | 4/1986 |
| EP | 0703430 A2 | 3/1996 |
| JP | H03-013901 A | 1/1991 |
| JP | H03-128418 A | 5/1991 |
| JP | H08-304118 A | 11/1996 |
| JP | 2000-288965 A | 10/2000 |
| JP | 2010-137321 A | 6/2010 |
| WO | 2005/019769 A1 | 3/2005 |
| WO | 2007/107777 A1 | 9/2007 |

OTHER PUBLICATIONS

Goswami et al; "Identifying robot parameters using partial pose information"; IEEE Control Systems, IEEE, USA; Oct. 1993; vol. 13; No. 5; pp. 6-14; XP011418938, Issn: 1066-033X, DOI: 10.1109/37.236317.

Driels; "Using Passive End-Point Motion Constrains to Calibrate Robot Manipulators"; Journal of Dynamic Systems, Measurement And Control; Jan. 1993; vol. 115; No. 3; p. 560; XP055475920, US ISSN: 0022-0434, DOI: 10.1115/1.2899139.

Nubiola et al; "Absolute Robot Calibration with a Single Telescoping Ballbar"; Precision Engineering; 2014; vol. 38; No. 3; Jul. 2014; pp. 472-480.

Levenberg; "A Method for the Solution of Certain Non-Linear Problems in Least Squares"; Quarterly of Applied Mathematics; 1944; vol. 2; pp. 164-168.

Marquardt; "An Algorithm for Least-Squares Estimation of Non-linear Parameters"; Journal of the Society of Industrial and Applied Mathematics; 1963; vol. 11; No. 2; pp. 431-441.

Bergström; "Method for calibration of off-line generated robot program"; (Master of Science Thesis, Chalmers University of Technology, Göteborg, Sweden); 2011; pp. 1-112; Report No. EX099/2011.

Shaopeng Cheng; "Calibration of Robot Reference Frames for Enhanced Robot Positioning Accuracy"; Robot Manipulators; 2008; pp. 95-112.

Gregori; "Étalonnage de Robots Industriels"; Projet de fin d'études, Ingénierie Industrielle, Université du Québec; Jul. 2010; pp. 3-68.

Olabi; "Amélioration de la précision des robots industriels pour des applications d'usinage a grande vitesse"; Arts et Métiers ParisTech; 2011; pp. 1-113.

Elatta et al; "An Overview of Robot Calibration"; Information Technology Journal; 2004; vol. 3; No. 1; pp. 74-78.

"Calibration and measurement with LaserLab"; Wiest AG; pp. 16-19.

Nubiola et al.; "A new method for measuring a large set of poses with a single telescoping ballbar"; Precision Engineering; Apr. 2013; vol. 37; No. 2; pp. 451-460.

"Tool Measurement with tool:in"; Wiest AG, Calibration Systems; Mar. 2016; Wayback Machine;<https://web.archive.org/web/20160320232050/http://www.wiest-ag.de/produkte/laserlab/software/tool_in>.

"Tool Measurement with tool:in"; Wiest AG, Calibration Systems; Sep. 2010; <https://web.archive.org/web/20100920190024/http://www.wiest-ag.de:80/produkte/laserlab/software/tool_in>.

Khalil et al; "Geometric calibration of robots"; Modeling, Identification & Control of Robots; 2002; pp. 257-289.

Nubiola et al. "A new method for measuring a large set of poses with a single telescoping ballbar"; Precision Engineering; Apr. 2013; vol. 37; No. 2; pp. 451-460.; <https://www.sciencedirect.com/science/article/abs/pii/S0141635912001821?via%3Dihub>.

\* cited by examiner

FIG. 31
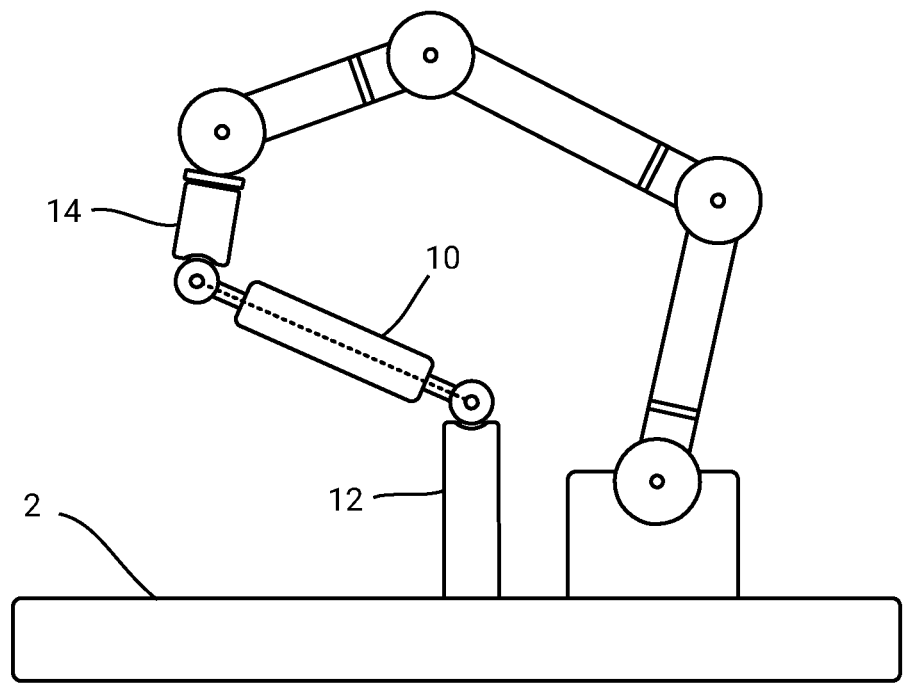
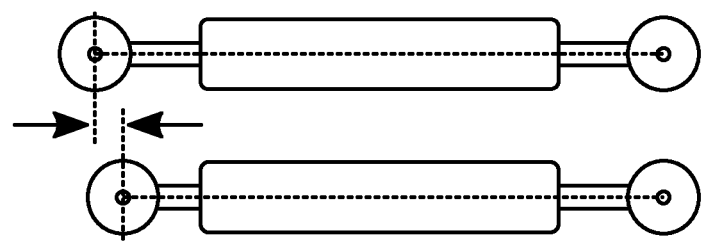
FIG. 32

$s = 0$ $s_0 > s$
$e_0 = s_0 - s$ $x_0 < x$
$d_0 < d$ $\Sigma_0 = (e_0)^2 + (E_0)^2$ $S_0 > S$
$E_0 = S_0 - S$ $s_1 < s_0$
$e_1 = s_1 - s$
$e_1 < e_0$ $x_0 < x_1 < x$
$d_0 < d_1 < d$ $\Sigma_1 = (e_1)^2 + (E_1)^2$
$\Sigma_1 < \Sigma_0$ $S_1 < S_0$
$E_1 = S_1 - S$
$E_1 < E_0$ FIG. 55A
FIG. 55B
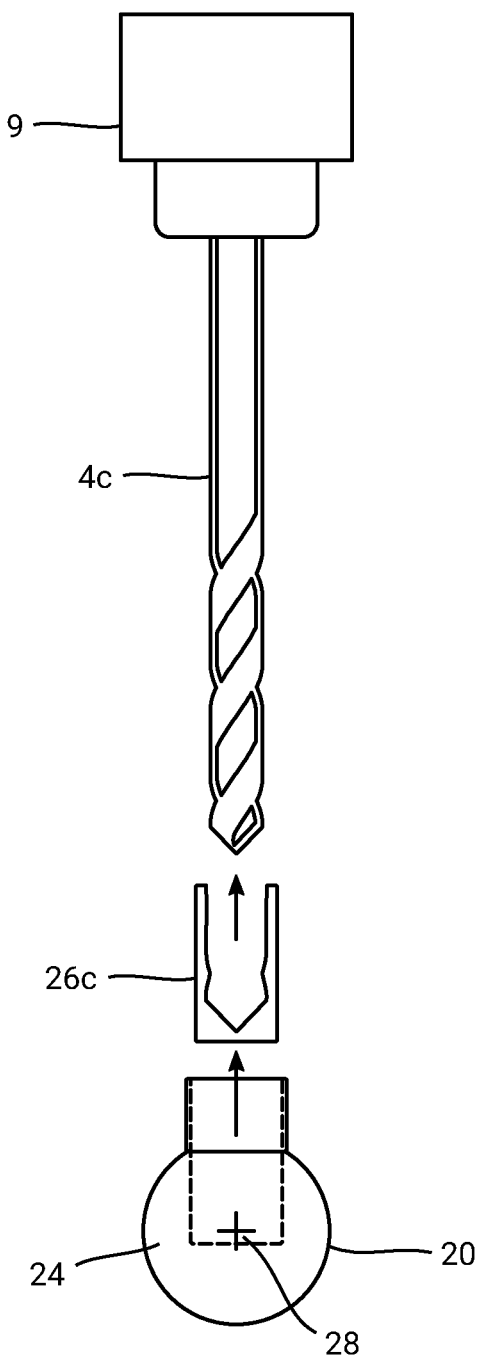
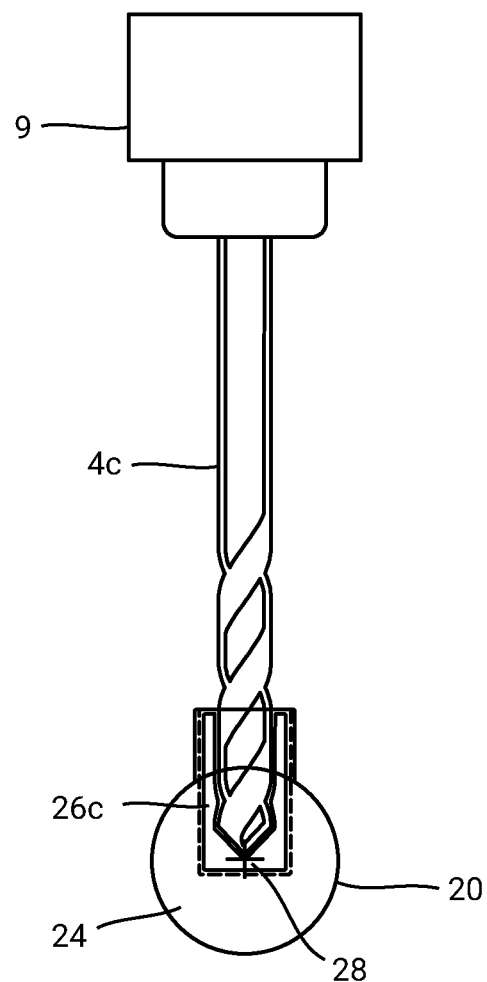

COORDINATE POSITIONING MACHINE

The present invention relates to a coordinate positioning machine. The present invention relates in particular, but not exclusively, to calibration of at least some aspect of an articulated robot.

Articulated robots are commonly used in manufacturing applications such as assembly, welding, painting, pick and place for printed circuit boards, packaging and labelling, palletizing, and product inspection. An articulated robot (or just "robot") is illustrated schematically in FIG. 1 of the accompanying drawings, and comprises an articulated arm 1 extending from a fixed base 2 to a moveable flange 3, which supports a tool 4. Typically, the flange 3 is provided with a coupling which allows for the tool 4 to be conveniently interchangeable.

The arm 1 comprises a plurality of links 5 connected by a plurality of rotary joints 6, forming a mechanical linkage. In the example illustrated in FIG. 1, there are seven rotary joints 6, which alternate between rotary joints having a rotational axis perpendicular to a longitudinal axis of its connected links 5, and rotary joints having a rotational axis parallel to a longitudinal axis of its connected links 5. Perhaps the most common arrangement for an industrial robot is to have six rotary joints, though a robot may also have one or more linear joints. Having multiple joints allows for flexibility in moving the tool 4 around a working volume and manipulating it into a variety of different poses. The degree of flexibility can be provided by having more or fewer joints in the arm.

However, having additional joints (and therefore additional flexibility) has a downside in that each joint contributes a positional error or uncertainty, and because of the serial nature of the linkages these errors are cumulative. It is important to be able to calibrate the robot in order to map out these errors or uncertainties.

Calibration of any type of non-Cartesian machine is a significant challenge, and this is indeed so for an articulated arm such as that illustrated in FIG. 1 having a plurality of rotary joints that are not fixed relative to one another and that can combine in complicated ways to position the tool in the working volume. Calibration of a Cartesian machine is typically more straightforward, because such a machine has three well-defined axes that are fixed relative to one another in an orthogonal arrangement, with each axis being largely independent of another. With a non-Cartesian machine, the position and orientation of each axis depends on the position and orientation of each other axis, so that the calibration will be different for each different machine pose.

Calibration using laser trackers is possible, but is typically expensive and slow to implement on site. Many other types of calibration techniques have in common the goal of specifying a parametric model of the machine concerned, in which a plurality of parameters are used to characterise the machine's geometry. Uncalibrated values are initially assigned to these parameters as a starting point for the machine geometry. During the calibration, the machine is moved into a variety of different poses (based on the current estimates of the machine parameters). For each pose, a calibrated measuring device is used to measure the actual pose, so that an indication of the error between the assumed machine pose and the actual machine pose can be determined.

The task of calibrating the machine then amounts to determining a set of values for the machine various parameters that minimises the errors, using known numerical optimisation or error minimisation techniques. An example of such a technique is the well-known Levenberg-Marquardt algorithm, which uses a least-squares approach to minimise errors knowing the derivatives of the errors according to each parameter optimised ("A Method for the Solution of Certain Non-Linear Problems in Least Squares", Kenneth Levenberg, 1944, Quarterly of Applied Mathematics, 2: 164-168; and "An Algorithm for Least-Squares Estimation of Nonlinear Parameters", Donald Marquardt, 1963, SIAM Journal on Applied Mathematics, 11 (2): 431-441). Other techniques are also possible, including those based on a maximum likelihood approach.

For a robot as illustrated in FIG. 1, these machine parameters might include various geometrical parameters such as the length of each of the robot links 5 and the rotation angle offset of each of the rotational joints 6 (with the angle from the encoder plus the calibrated offset giving the actual angle), as well as various mechanical parameters such as joint compliance and friction. When properly calibrated, with all of these machine parameters known, it is possible to predict with more certainty in what position the tool 4 will actually be when the various joints 6 are commanded by a robot controller 7 to move to different respective positions. In other words, the machine parameters resulting from such a calibration provide a more accurate characterisation of the machine geometry.

It has been previously considered to use a ballbar, such as the QC20-W ballbar manufactured and sold by Renishaw plc, to form part of a calibration procedure for a robot. For example, such a procedure is described in "Absolute Robot Calibration with a Single Telescoping Ballbar" by Albert Nubiola (Precision Engineering, 2014). In that article it is described that two custom-made fixtures are used, each having three ballbar connection points. A single telescoping ballbar is connected in turn between different pairs of connection points on the two fixtures, with one of the fixtures being commanded by the controller to move to each of 72 different poses with respect to the other fixture. The measurements are used to determine the parameters of the machine, using an error minimisation technique, and thereby to calibrate the machine.

More background relating to techniques for robot calibration can be found in: (a) "Method for calibration of off-line generated robot program" by Gustav Bergstrom (Master of Science Thesis, Chalmers University of Technology, Goteborg, Sweden, 2011, Report No. EX099/2011); (b) "Calibration of Robot Reference Frames for Enhanced Robot Positioning Accuracy" by Frank Shaopeng Cheng (a chapter in "Robot Manipulators" Edited by Marco Ceccarelli, ISBN 978-953-7619-06-0); (c) "Étalonnage de Robots Industriels" by Gregori (July 2010, Proj et de fin d'études, Ingénierie Industrielle, Université du Québec); (d) "Amelioration de la precision des robots industriels pour des applications d'usinage a grande vitesse" by Adel Olabi (Arts et Métiers ParisTech, 2011, downloadable at https://pastel.archives-ouvertes.fr/pastel-00649019); (e) "An Overview of Robot Calibration" by A. Y. Elatta et al (Information Technology Journal 3 (1): 74-78, 2004); and (f) "Modeling, Identification and Control of Robots" by Khalil and E Dombre, ISBN 978-1-903996-66-9.

It is desirable to provide improved and/or simplified methods of calibrating a robot, or at least certain aspects of the robot's geometry.

U.S. Pat. No. 5,297,238 describes a method of calibrating a tool control frame on a robot, in one embodiment of which a probe is attached to a tool on the robot and is sensed in a contactless manner by a digitizing plate. US 2004/0003647 discloses a method of correcting positional errors in an end effector of a machine using a ballbar as a measuring device. DE 3504464 C1 describes the use of three telescopic measurement rods in a tripod arrangement.

According to a first aspect of the present invention there is provided:

a method of calibrating a coordinate positioning machine, wherein the geometry of the machine is characterised by a parametric model and wherein the calibration method is intended to determine a new set of model parameters that characterises the geometry of the machine better than an existing set of model parameters, and wherein the method comprises:

controlling the machine into a pivot pose in which a target point associated with a moveable part of the machine and a pivot point associated with a fixed part of the machine are separated from one another by a known separation, and determining an error value for that pose based on the known separation and a separation expected for that pose from the existing model parameters;

controlling the machine into a plurality of different target poses;

for each target pose, using a length-measuring device to measure a separation between the target point and the pivot point and determining an error value for that pose based on the measured separation and a separation expected for that pose from the existing model parameters and from the pivot pose;

determining an overall error measure from the error values; and determining a new parameter set that would result in a lower overall error measure than for the existing parameter set.

The method may comprise determining a new set of error values based on the new parameter set, and from those error values determining an even newer parameter set. This may be repeated as often as desired, for example until the overall error measure falls below a predetermined threshold.

The known separation may be a null or zero value or vector. In other words, the target point and the pivot point may be substantially coincident with in the pivot pose.

The method may comprise determining new values for only a subset of the model parameters. The remainder of the model parameters may be assumed to be correct for the purpose of the calibration method, or at least may remain unchanged during the method, with only the parameters of the subset being varied in order to determine a new set of model parameters that characterises the geometry of the machine better than the existing set of model parameters.

The subset of model parameters may relate to a tool centre point of the machine, for example a position of the tool centre point.

The measured separation may be a one-dimensional separation, or in other words a separation in one degree of freedom.

The separation between the target point and the pivot point may be measured by a length-measuring device.

The length-measuring device may be a ballbar.

The target poses may be performed before or after the pivot pose, but it is preferable that the pivot pose is performed before the target poses. This is because the pivot position may be set at least partly by way of the step of controlling the machine into the pivot pose.

The known separation between the pivot point and target point may be achieved by using an adjustable pivot which allows some movement of the pivot point as the target point is being moved by the machine in the vicinity of the pivot point, with the pivot point coupling to the target point in a known relationship between them, thereby giving the known separation. The pivot may be locked in that position for the subsequent target pose measurements. The adjustable pivot may allow at least lateral translational movements. The adjustable pivot may allow rotation of the pivot.

The measured separation may instead be a separation in two degrees of freedom. The measured separation may be a separation in three degrees of freedom, measured for example by a tripod. The measured separation may instead be a separation in four degrees of freedom. The measured separation may instead be a separation in five degrees of freedom. The measured separation may instead be a separation in six degrees of freedom, measured for example by a hexapod. The measured separation can be considered to be a one- to six-dimensional vector. Where it is stated that a target point is associated with a moveable part of the machine and a pivot point is associated with a fixed part of the machine, these can instead be considered to be a target part and a pivot part respectively, so that a rotational relationship (separation) between them can be defined and not just a translational relationship (separation).

It will be understood that, for an N-dimensional separation, each "error value" described above will actually comprise N corresponding respective separate error values. The "error value" determined for the pivot pose and for each target pose could therefore be considered as and/or referred to instead as an "error" or "error measure", each having one or more "error values".

The machine may be a robot. The machine may be an articulated robot. The machine may be a six-axis articulated industrial robot. A robot can be considered to be a coordinate positioning machine having three or more axes, whether rotary or linear of a combination thereof, and whether serial or parallel or a combination thereof.

According to a second aspect of the present invention, there is provided an adaptor which is adapted to fit onto and/or around an element on or for a coordinate positioning machine, the element having a point of interest, wherein the adaptor comprises an at least part-spherical bearing surface having a centre point which, when fitted onto and/or around the element, substantially coincides with the point of interest.

The element may be a tool. The element may be a tool at a moving end of the machine. The element may be a tool carried and/or used and/or manipulated by the machine.

The point of interest may be a tool centre point of the tool.

The adaptor may be adapted to receive a plurality of different inserts in a generic manner, with the inserts being adapted to receive different respective elements or types of element. This enables the adaptor to be used with a variety of different elements or types of element.

Each insert may be shaped internally to match an external shape of its corresponding element.

Each insert may be adapted to account for the location of the point of interest of its corresponding element to ensure that the point of interest is substantially coincident with the centre of the at least part spherical surface of the adaptor when fitted onto and/or around the element.

At least some of the inserts may be 3D printed based on a CAD model of the element.

Inserts may be provided for a plurality of elements selected from welding tools, machining tools such as drill bits and calibration shafts.

According to another aspect of the present invention, there is provided a kit (e.g. kit of parts) comprising a measuring device together with an adaptor of the second aspect of the present invention. The measuring device comprises a coupling element which is adapted to couple to and bear against the bearing surface of the adaptor such that a measurement point of the measuring device is substantially coincident with the centre point of the adaptor, and remains so as the coupling element moves over at least a predetermined or working part of the bearing surface.

The measuring device may be adapted to provide a measurement of a separation between two measurement points of the measurement device.

The measuring device may be a length-measuring device.

The measuring device may be a ballbar.

The coupling element may be in the form of a cup.

The measurement point may be at the centre of an at least partly spherical surface of the cup, or an at least partly spherical surface passing through bearing points of the cup (e.g. where the cup comprises three points of contact).

The cup may be adapted to couple with the at least part spherical surface of the adaptor.

The measuring device may comprise a ball at one end and a cup at the other end.

The measuring device may comprise a cup at both ends.

The coupling may be kinematic or at least pseudo kinematic.

The coupling element may be pseudo kinematic with the contact surface covering a substantial portion of the bearing surface (e.g. a cone or a portion of a sphere). This may help the coupling element to step over grooves or holes in the ball adaptor.

The kit may comprise the inserts mentioned above.

According to another aspect of the present invention, there is provided a method of calibrating a coordinate positioning machine, comprising taking a kit according to the previously-described aspect, fitting the adaptor onto and/or around the element, with the element still on the coordinate positioning machine, coupling the measuring device to the adaptor so that the coupling element of the measuring device bears against the at least part spherical bearing surface of the adaptor, and performing a measurement operation, such that during the measurement operation the measurement point of the measuring device is coincident with the centre point of the adaptor and remains so as the coupling element of the measuring device moves over at least a predetermined or working part of the at least part spherical bearing surface of the adaptor.

The method may comprise performing a first operation using the tool before fitting the adaptor for the measurement operation, without removing the tool between the first operation and fitting the adaptor for the measurement operation.

The method may comprise performing a further measurement operation on the tool, such as with a contact or non-contact tool setter to determine a length of the tool, either before fitting the adaptor or after removing the adaptor and without removing the tool.

The meaning of the term "substantially coincident with" will be understood by the skilled person as being dependent on the context in which the invention is used, and the accuracy expected and/or required. This term may be interpreted as meaning "coincident, within a required tolerance, with" or "coincident, within a predetermined tolerance, with". For example, "substantially coincident with" may in some applications mean within 5 mm of, or more preferably within 2 mm of, or more preferably within 1 mm of, or more preferably within 0.5 mm of, or more preferably within 0.1 mm of.

According to an embodiment of the second aspect of the present invention, there is provided an adaptor which is adapted to fit onto and/or around a tool on or for a coordinate positioning machine, the tool having a predetermined tool centre point, wherein the adaptor comprises an at least part-spherical bearing surface having a centre which, when fitted onto and/or around the tool, coincides with or is a known offset from the tool centre point of the tool. The tool centre point of the tool is inherently defined by or relative to the form and/or shape of the tool. A measuring device is also provided for use with such an adaptor, the measuring device having a coupling element which is adapted to couple to and bear against the bearing surface of the adaptor such that a measurement point of the measuring device is coincident with or is a known offset from the centre of the adaptor, and remains so as the coupling element moves over at least a predetermined or working part of the bearing surface. The measuring device may be a length-measuring device. The measuring device may be adapted to provide a measurement of the separation between two measurement points of the device. The measuring device may be a ballbar. The measurement point may be at the centre of a ball at an end of the measuring device or a ball to which the measuring device couples. The coupling element may be in the form of a cup. The measuring device may have a ball at one end and a cup at the other end, or a cup at both ends, with the cup being adapted to couple with the at least part spherical surface of the adaptor. The coupling may be kinematic or at least pseudo kinematic.

According to a third aspect of the present invention, there is provided an extension part for a ballbar which is configured to provide the ballbar with an additional range of travel. The ballbar of this aspect could instead be another type of length-measuring device. This provides an overtravel extension capability, for example as part of a modular system. The extension part may be adapted to extend the range of travel but not the range of measurement. The extension part may be adapted to provide an additional range of travel to both sides of the range of measurement. The extension part may be adapted to provide an additional range of travel at one side of the range of measurement only. The extension part may comprise a ball which acts as one of the balls of the ballbar. A modular system may be provided which comprises a measurement part, a standard end part and the extension part, with the measurement part being couplable to the standard end part to form a first type of ballbar, and couplable separately to the extension part to form a second type of ballbar.

According to a fourth aspect of the present invention, there is provided a computer program which, when run by a computer or a machine controller, causes the computer or machine controller to perform a method according to the first aspect of the present invention or according to the method associated with the second aspect. The program may be carried on a carrier medium. The carrier medium may be a storage medium. The carrier medium may be a transmission medium.

According to a fifth aspect of the present invention, there is provided a computer-readable medium having stored therein computer program instructions for controlling a computer or machine controller to perform a method according to the first aspect of the present invention or according to the method associated with the second aspect.

Reference will now be made, by way of example, to the accompanying drawings, in which:

FIG. 1, discussed hereinbefore, is a schematic illustration of an articulated robot;

FIG. 2 schematically illustrates a robot moving an attached tool so that the tool centre point (TCP) remains in the same position;

Figure 9:
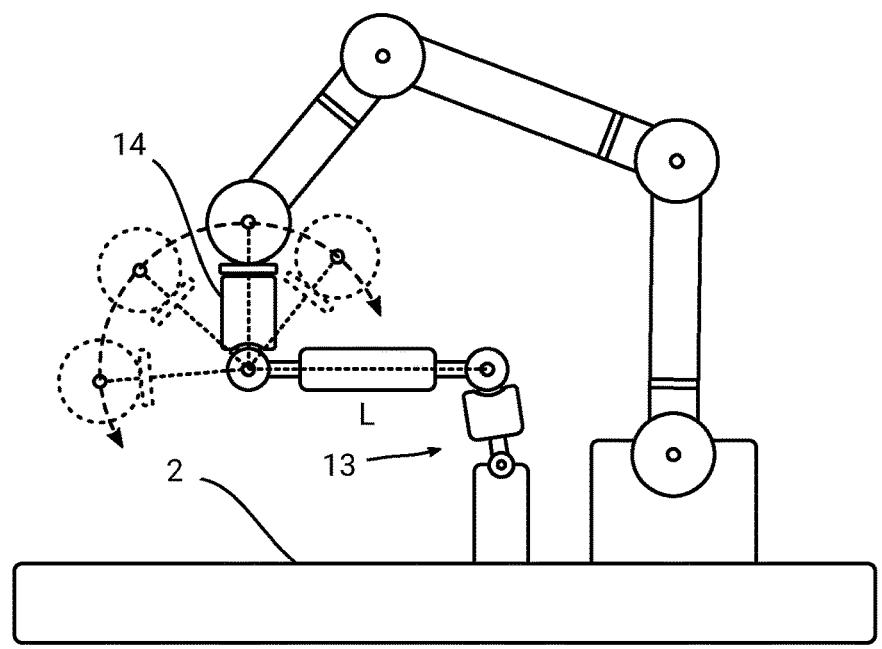
Figure 13:
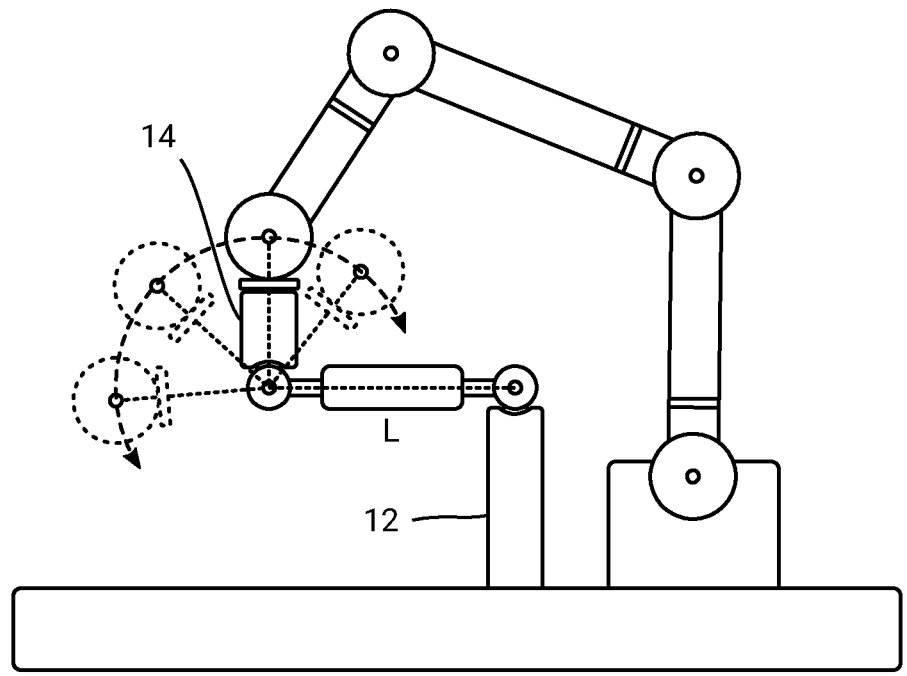
Figure 14:
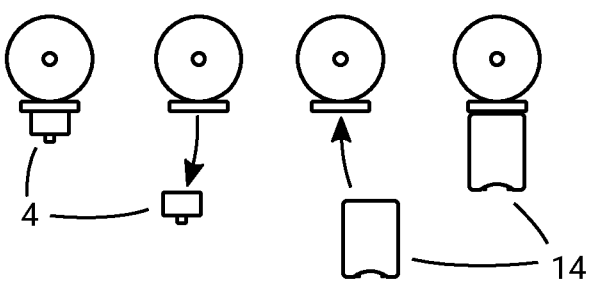
Figure 15:
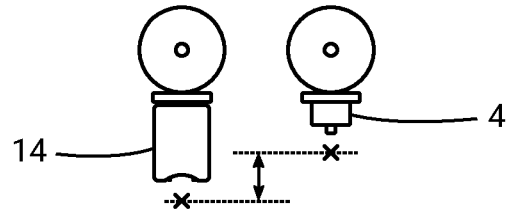
Figure 16:
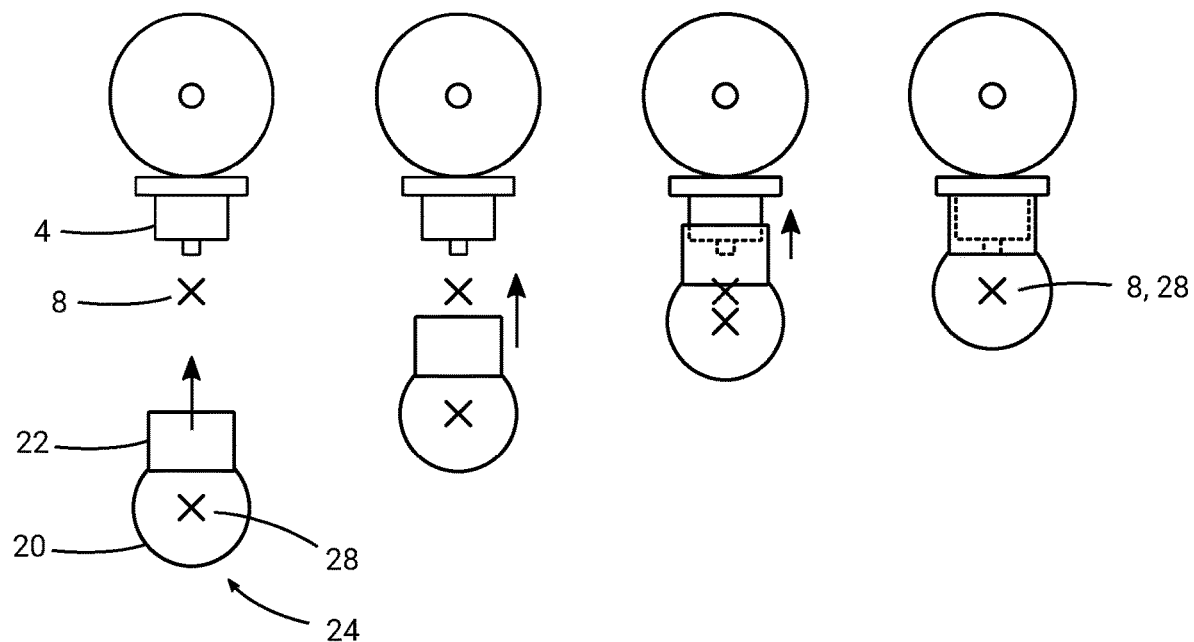
Figure 22A:
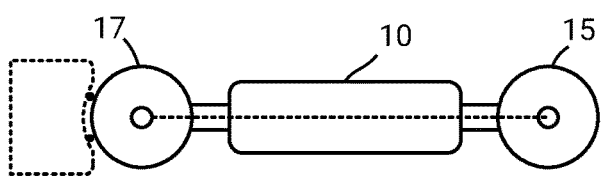
Figure 22B:
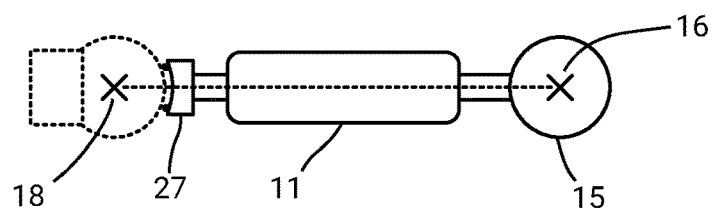
Figure 23:
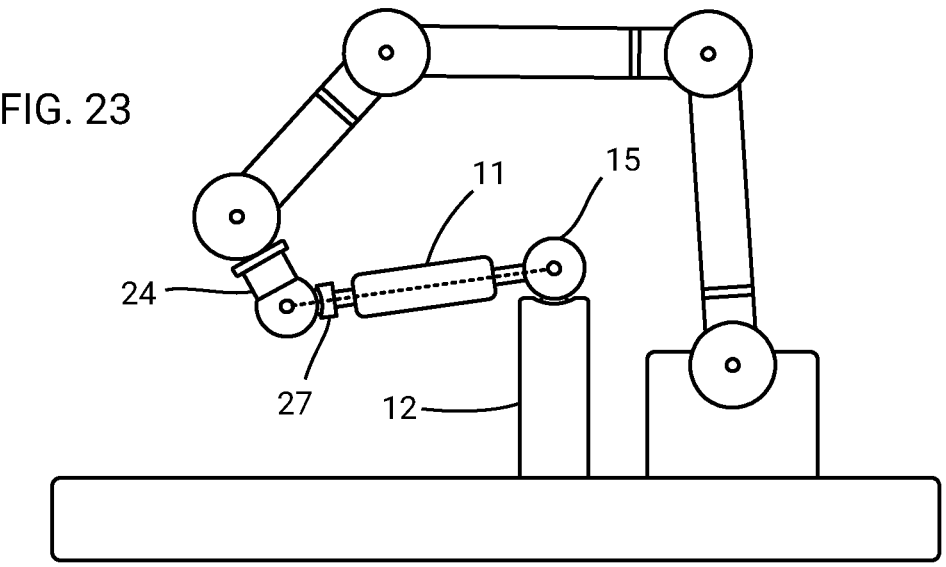
Figure 24:
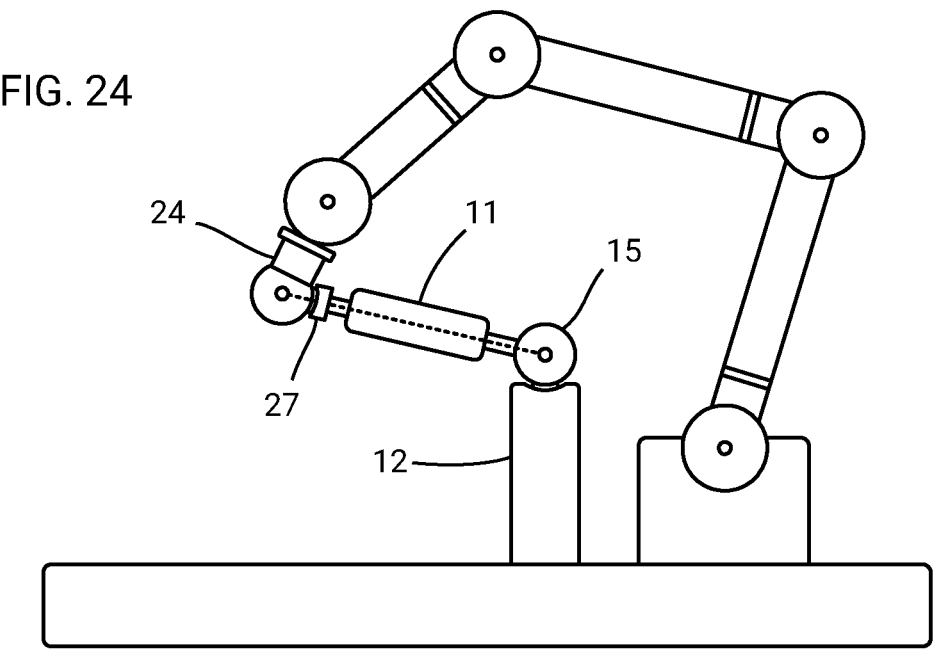
Figure 25:
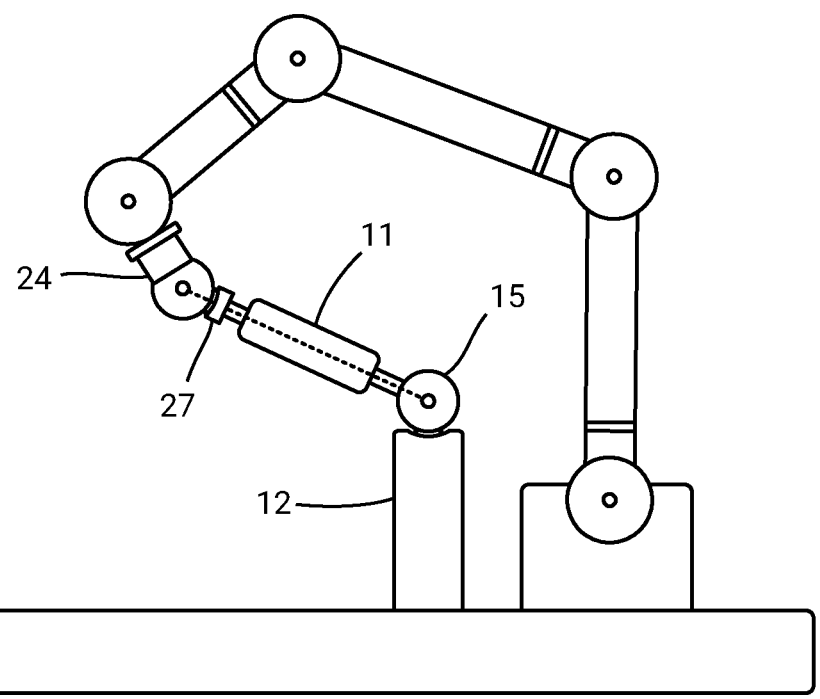
Figure 26:
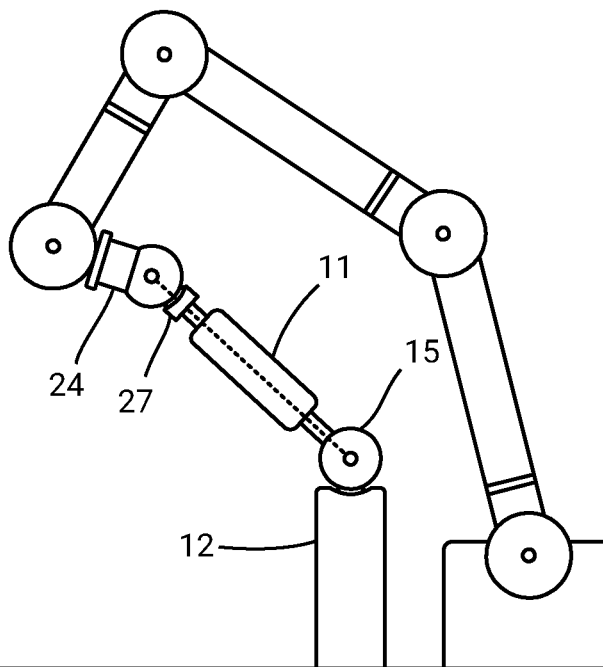
Figure 37:
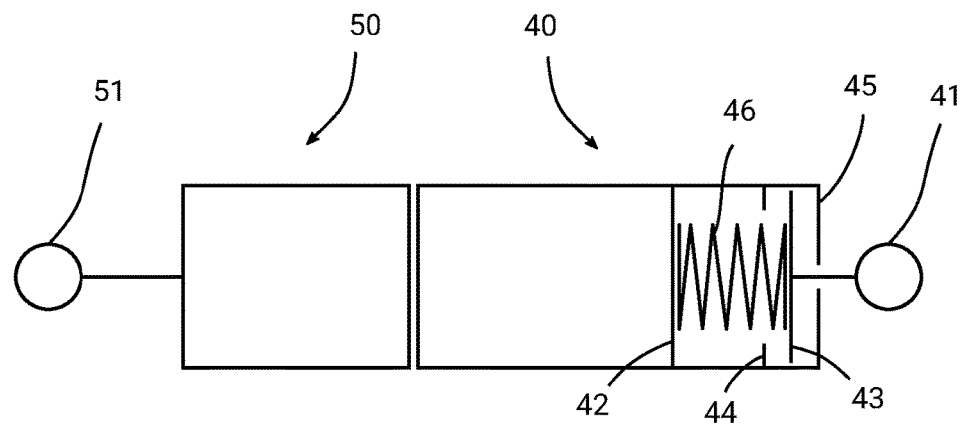
Figure 38:
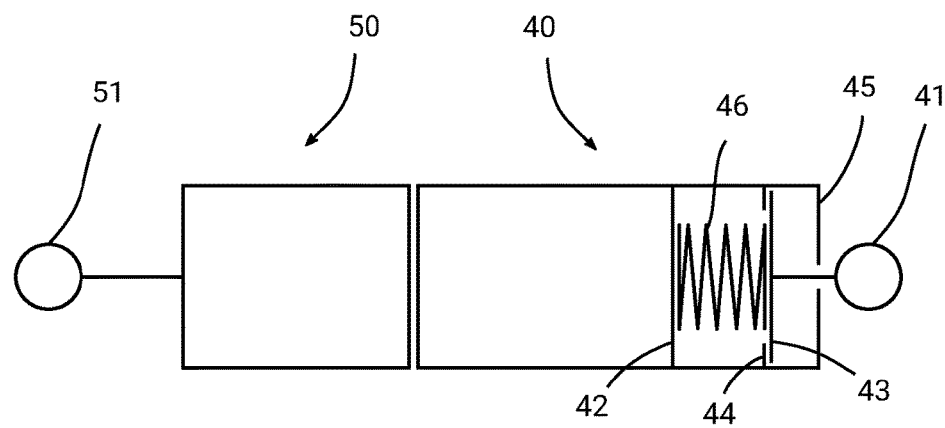
Figure 39:
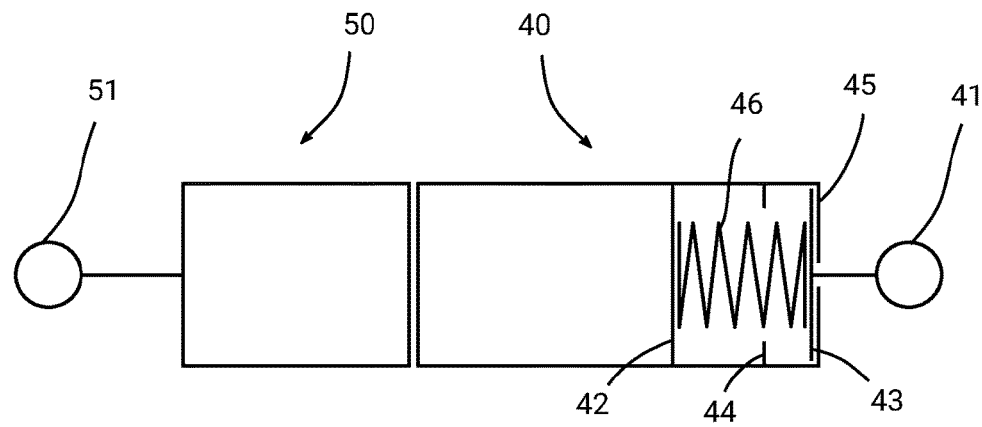
Figure 51:
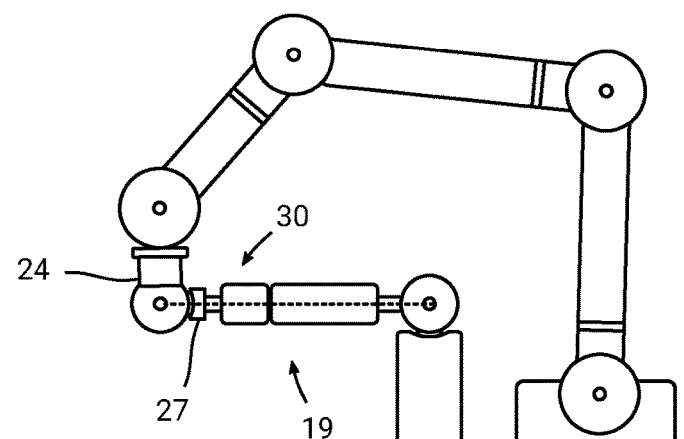
Figure 56A:
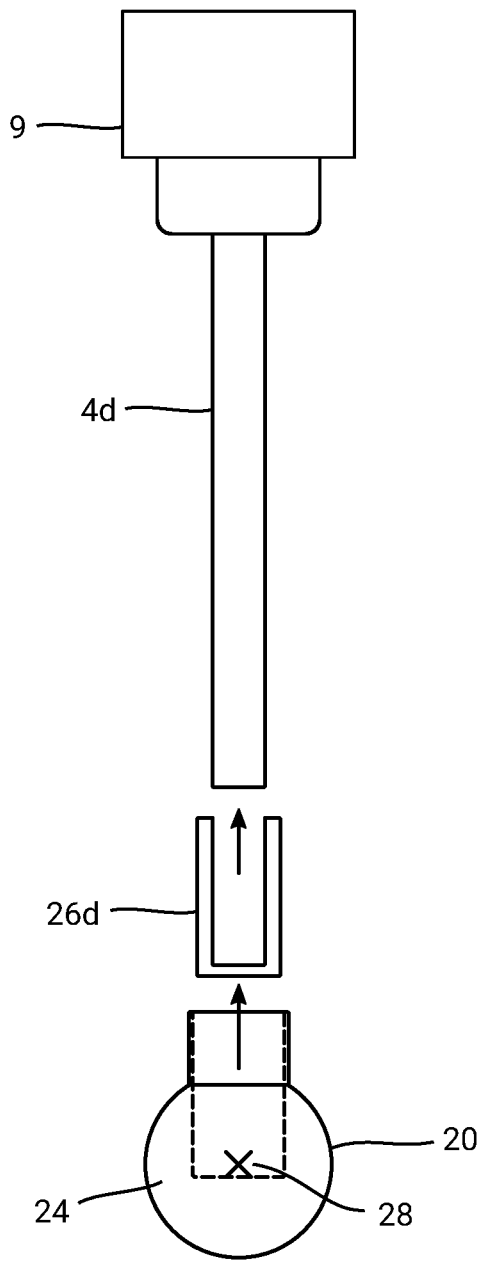
Figure 56B:
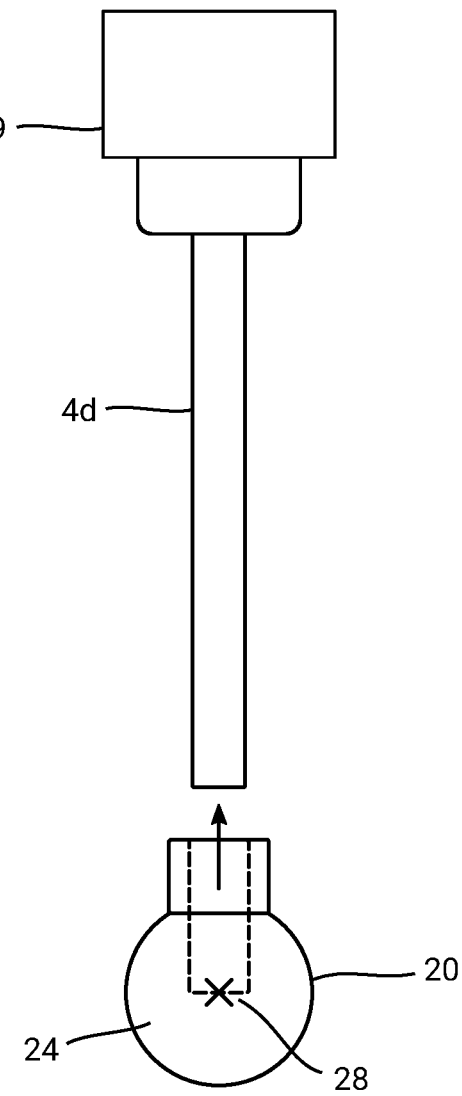
Figure 57A:
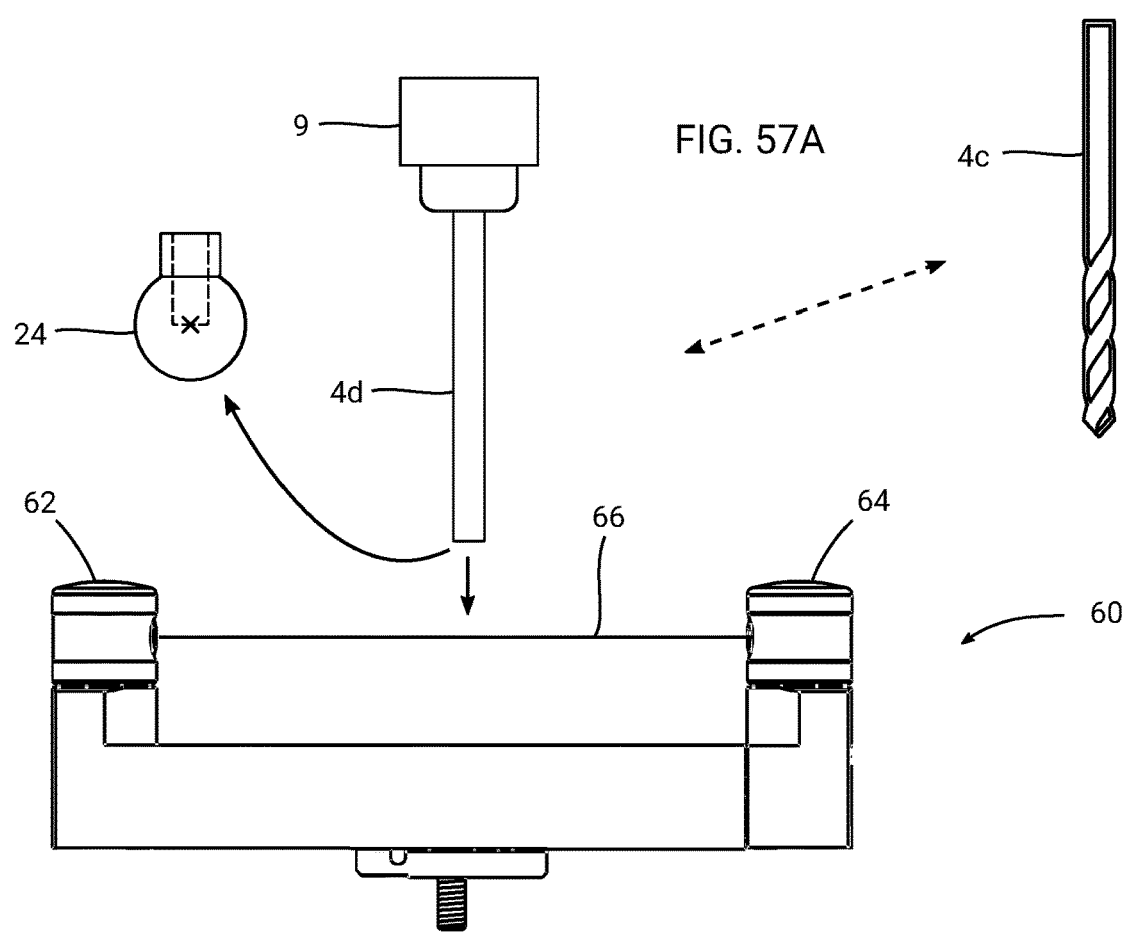
Figure 57B:
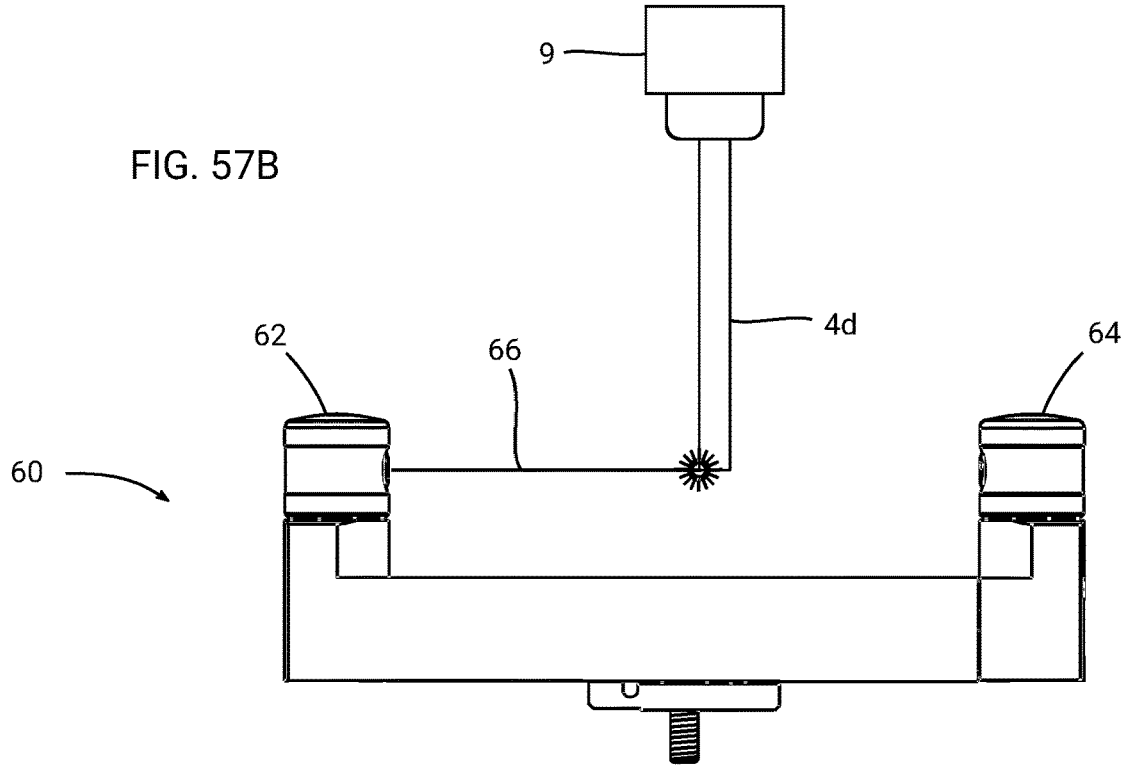
Figure 58:
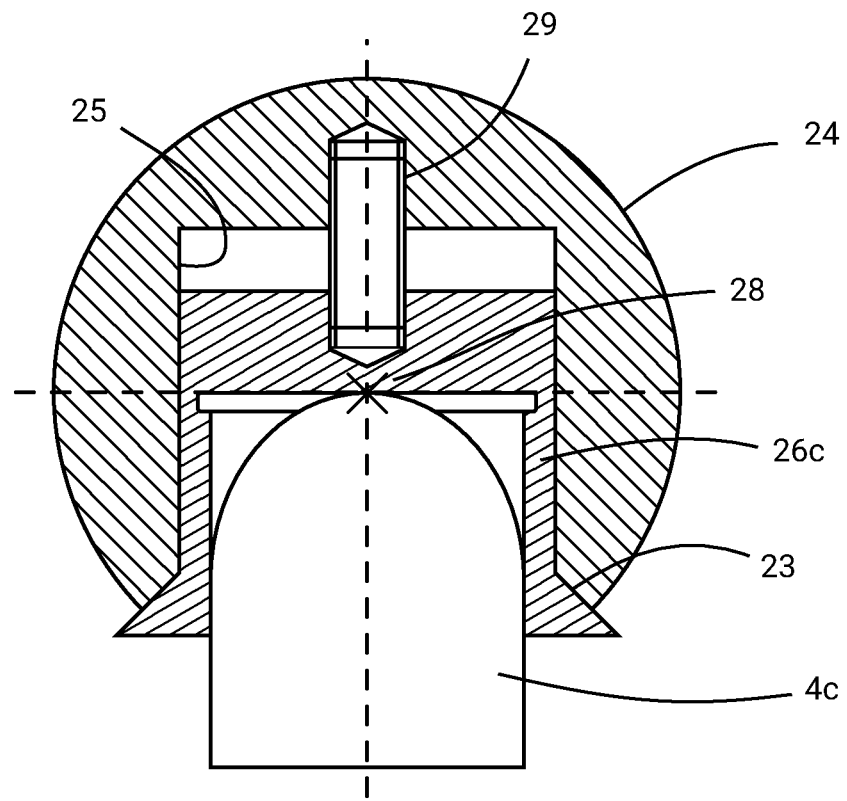
Figure 59:
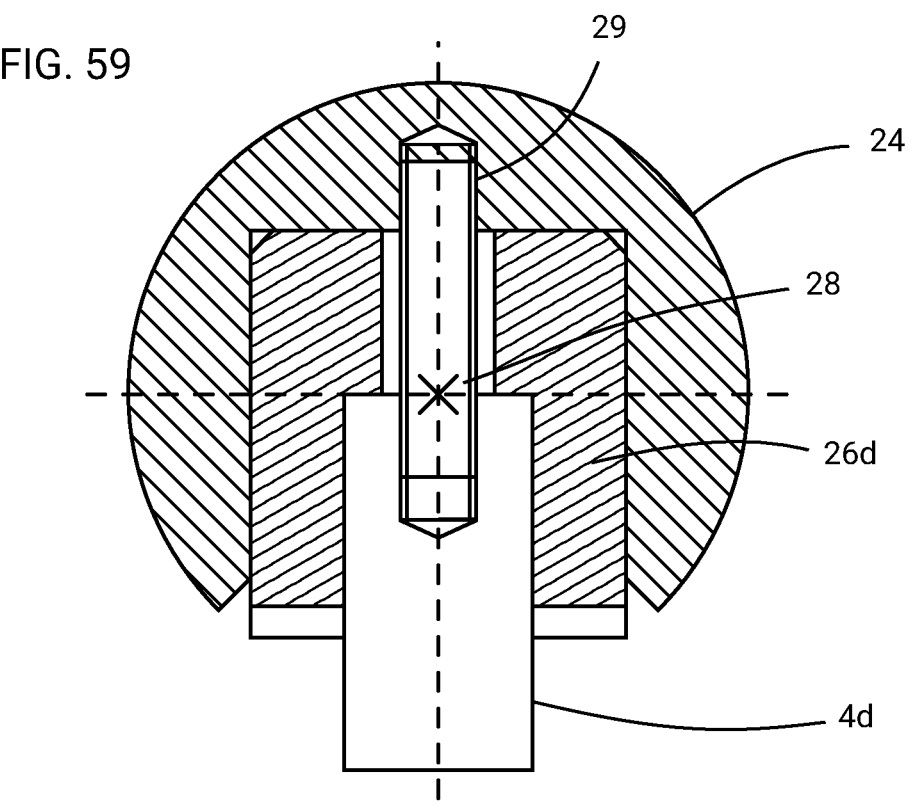

FIG. 13 differs from FIG. 9 in that a fixed pivot is illustrated rather than an adjustable pivot;

FIGS. 14 and 15 are for use in explaining a possible drawback with the method of the first embodiment of the first aspect of the present invention;

FIG. 16 illustrates a ball adaptor concept according to an embodiment of the second aspect of the present invention;

FIGS. 17 to 21 and 23 to 26 illustrate steps in a method according to a second embodiment of the first aspect of the present invention, making use of a ball adaptor according to an embodiment of the second aspect of the present invention;

FIGS. 22A and 22B illustrate two types of ballbar, one having a ball at both ends and the other having a ball at one end and a cup at the other, with the latter being used in the second embodiment of the first aspect of the present invention;

FIGS. 27 to 30 illustrate a modular ball adaptor system in which a generic ball adaptor is adapted to receive a variety of inserts for different tools;

FIGS. 31 to 36 illustrate a first embodiment of a third aspect of the present invention, in which an extension part is used to provide the ballbar with an additional range of travel;

FIGS. 37 to 39 illustrate a modular ballbar arrangement;

FIGS. 40 to 43 schematically illustrate the use of an extension part embodying the third aspect of the present invention with the modular ballbar arrangement of FIGS. 37 to 39;

FIGS. 44 to 50 are perspective views showing key parts of the extension part of FIGS. 40 to 43 in more detail;

FIG. 51 illustrates an embodiment in which the extension piece of the third aspect is used with the ball adaptor of the second aspect;

FIGS. 52 to 54 provide a schematic overview of the concept underlying an embodiment of the first aspect of the present invention;

FIGS. 55A and 55B illustrate the ball adaptor concept of the second aspect of the present invention as applied to a drill bit;

FIGS. 56A and 56B illustrate the ball adaptor concept of the second aspect of the present invention as applied to a calibration shaft;

FIGS. 57A and 57B illustrate how the ball adaptor concept enables multiple calibration or measurement operations to be performed without having to remove the tool;

FIG. 58 illustrates an example implementation of the ball adaptor for grip attachment to a tool; and FIG. 59 illustrates an example implementation of the ball adaptor for screw attachment to a tool.

When programming a robot to move the tool 4 around the working volume, an important piece of information is the location of the tool centre point (TCP) relative to the part of the robot to which the tool 4 is attached (e.g. the flange 3). Setting up the coordinates of the tool centre point of a robot is a key step when installing a robot, and it is done on every robot. The tool centre point is the point in relation to which all robot positioning is defined, and constitutes the origin of the tool coordinate system. The tool centre point might correspond, for example, to the tip of an arc welding gun, the centre of a spot welding gun, or the end of a grading tool. The location of the tool centre point will therefore depend on the application concerned. In operation, it is the tool centre point that will be jogged or moved to the desired target position with the desired tool orientation.

Figure 2:
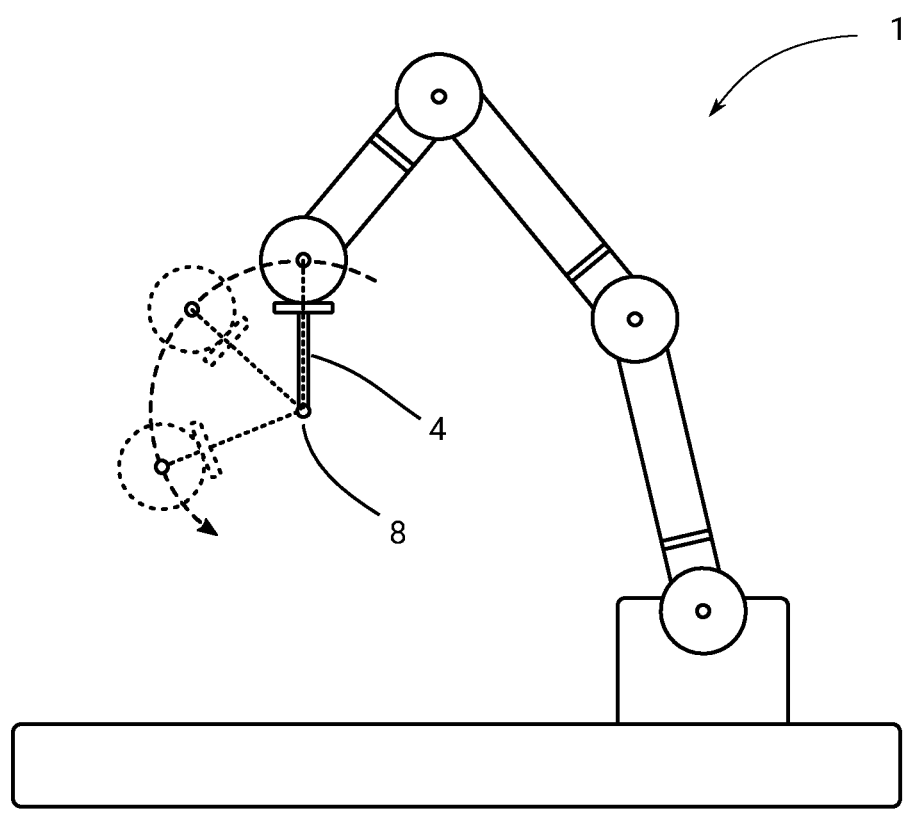

FIG. 2 schematically illustrates the robot being instructed to move the tool 4 so that the tool centre point 8 remains in the same position, which is a test that is typically performed to verify that the tool centre point has been correctly identified. Such a test is sometimes known as a "tool orientation test". The objective is to assess the robot's accuracy by measuring its ability to rotate around its tool centre point without moving. The result of the test is the spread or deviation of distances measured by the ballbar. For most robots, it will not be possible to attach the target ball of the ballbar in the exact position of the robot's working tool. Hence, the tool orientation test will measure the distance between the target ball and the working tool rather than the actual robot errors. It will then be necessary to measure the actual position of the target ball on the robot and input it in the robot's controller.

However, rather than merely verify the position of the TCP as with the tool orientation test, the aim of an embodiment of the present invention to determine the position. The most commonly-used method currently is the pin-to-pin method in which the operator visually aligns two pins with different orientations (one of which is fixed and the other of which is moveable by the operator to reference the TCP). This is a convenient method but it is relatively inaccurate because it depends to a large extent on the operator; it also requires the tool 4 to be removed and replaced by the pin.

Figure 3:
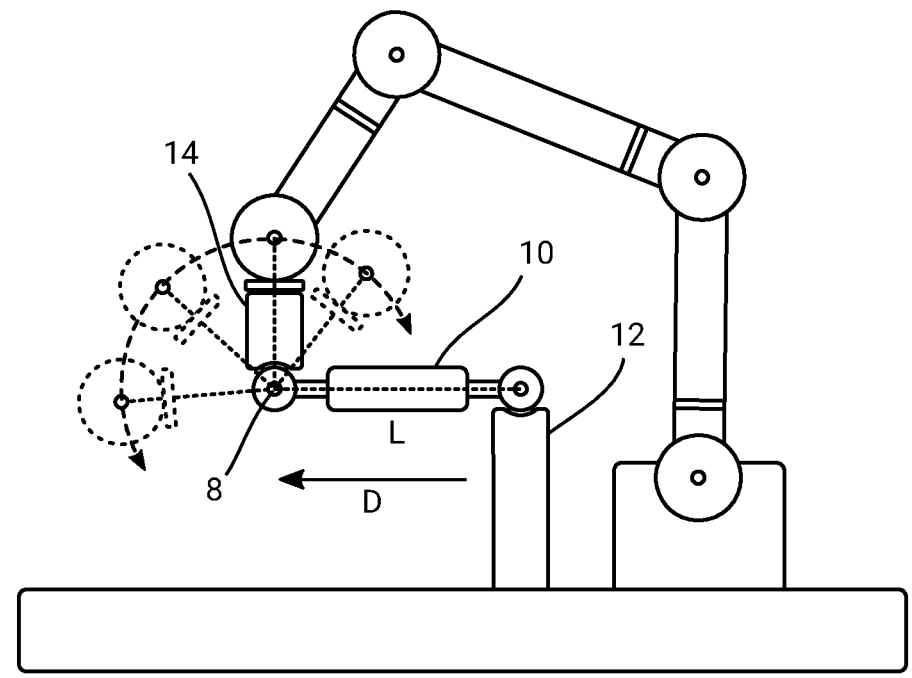
FIGS. 3 and 4 illustrate two previously-considered methods for identifying the TCP.
Figure 4:
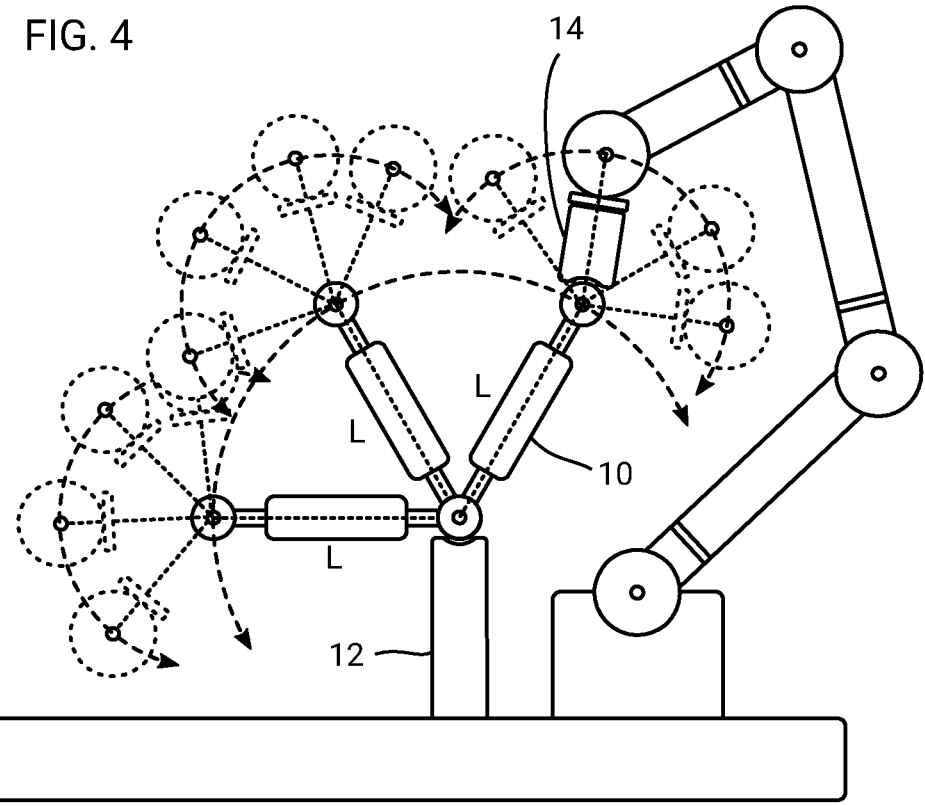

Before describing how an embodiment of present invention is used to identify the TCP, some further background will be provided with reference to FIGS. 3 and 4, in order to put an embodiment of the present invention into context.

In the matter of measuring the tool centre point (TCP) of a robot with a distance measurement device (such as a ballbar), the principle is to measure distances with different orientations of the tool and to deduce the TCP coordinates from these measurements. One issue is to find out in which direction to consider the distances measured. There are two main approaches for this: (a) consider that all measurements are taken with the measurement device pointing in the same direction; and (b) take measurements with various directions and identify the position of the pivot centre from that information.

The first approach is illustrated in FIG. 3. In this method, a ballbar 10 is attached between a first ballbar mount 12 fixed to the base of the machine (this is referred to as the "pivot" for the ballbar 10) and a second ballbar mount 14 attached to the robot itself. Therefore, in this example the tool 4 of FIGS. 1 and 2 has been replaced by the ballbar mount 14, which has a magnetic cup into which the ball at one end of the ballbar 10 locates in a kinematic or pseudo-kinematic fashion. Such a kinematic magnetic cup is a standard and well-known accessory of the ballbar system, and allows the ball to sit in a known and repeatable position within the cup, and so that the centre of the ball does not move as the ballbar 10 pivots around the mount. In the context of locating one body relative to another, kinematic design considerations are met by constraining the degrees of freedom of motion of the body using the minimum number of constraints, and in particular involves avoiding over constraining. Over constraining can result in multiple points of contact between two bodies, which allows one body to rest in more than one position against the other. Accordingly, the body's location is not repeatable (i.e. not predictable or well defined) as it is not known at which of the several positions the body will come to rest. Since a surface contact has, in theory, an infinite number of point contacts, an ideal kinematic coupling consists of point contacts only; however, in practice a pseudo-kinematic coupling is sufficient, where there is contact over a small surface area, which also helps to reduce wear and loading on the bearing surfaces.

For this example, it is assumed that the ballbar mount 14 in FIG. 3 is configured such that the ball of the ballbar 10 will sit in the kinematic cup of the mount with its centre coinciding with the TCP of the tool 4, but an embodiment of the second aspect of the present invention (described further below) provides a solution which avoids the need for such an assumption. Alternatively, an appropriate offset adjustment can be made in the method below to account for the offset between tool's TCP and the location of the ball centre.

When the robot is commanded to rotate around the same TCP, assuming that the initial value of the TCP coordinates in the controller are not far from reality, the TCP remains almost fixed. It can then be considered that all measurements from the ballbar 10 are performed along the same direction (deviations in the direction result in second order errors in the computations, which are tolerable). In these conditions the error in the TCP coordinates can be identified in the controller and the TCP coordinates can then be corrected, using an error minimisation technique like that mentioned previously. This ideally requires a minimum of four measurements, though five or six measurements are better.

For this method, the following information is required as input to the error minimisation algorithm:
(a) the direction D from which the measurements are taken;
(b) the coordinates of the TCP in the controller; and
(c) the coordinates of the robot for each measurement.

In the above, the robot coordinates are the Cartesian coordinates determined from the controller on the assumption that the robot is already fully calibrated (or ideal). In other words, any errors from the robot itself are ignored. Rather, this procedure is to identify errors in the TCP coordinates, which are coordinates relative to the robot. In the above procedure, the input of the direction can be problematic as there is a risk of confusion in the frame used to express this direction.

The second approach is illustrated in FIG. 4. Since the position of the rotation centre of the pivot mount 12 (the pivot point) is not known, it is necessary to identify it together with the TCP coordinates. This is achieved in the second approach by taking measurements with the ballbar 10 pointing in various directions, with the pivot point being at the intersection of those various directions. The robot is commanded to rotate around its TCP for each of these directions, as with the first approach.

With the second approach, the TCP coordinates and the position of the pivot centre can be identified together. This requires a minimum of six measurements, though usually nine to twelve measurements are better. This method can also be made more elaborate, because by increasing the number of measurements it becomes possible to identify more parameters of the robot.

For the second approach it is only required to input the position of the robot and the coordinates of the TCP in the controller for each measurement. The complexity of this approach results from the large number of measurements required and the necessity to drive the robot around the surface of a sphere.

Figure 10:
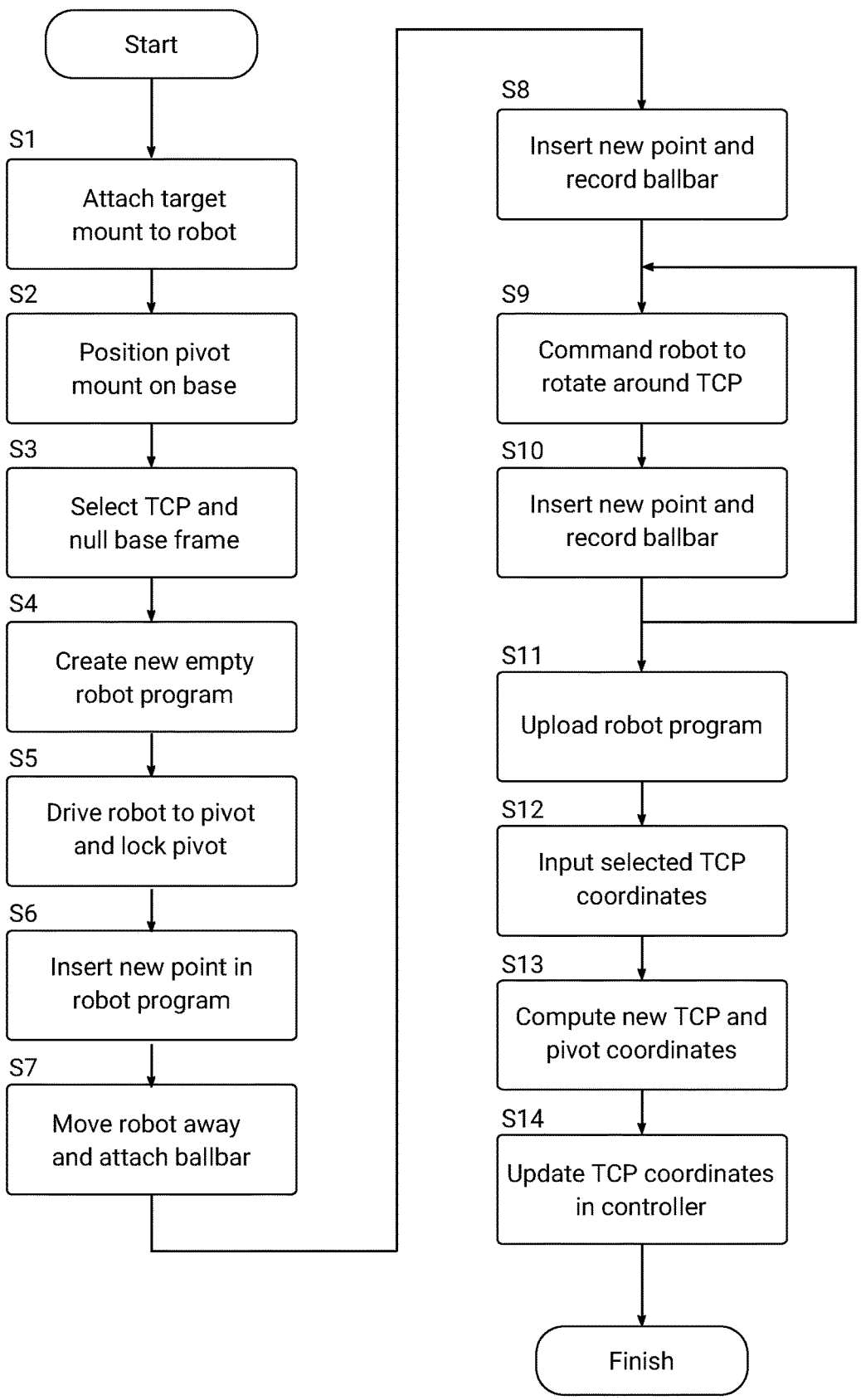
FIG. 10 is a schematic flow diagram of the method illustrated in FIGS. 5 to 9.

An approach according to a first embodiment of a first aspect of the present invention will now be described with reference to FIGS. 5 to 11, with FIG. 10 providing a schematic flow diagram of the procedure. The concept underlying this embodiment can be summarised as using the robot coordinates at the position of the pivot as input data for the identification of the TCP using an error minimisation method. This is not done with previously-considered techniques.

Figure 5:
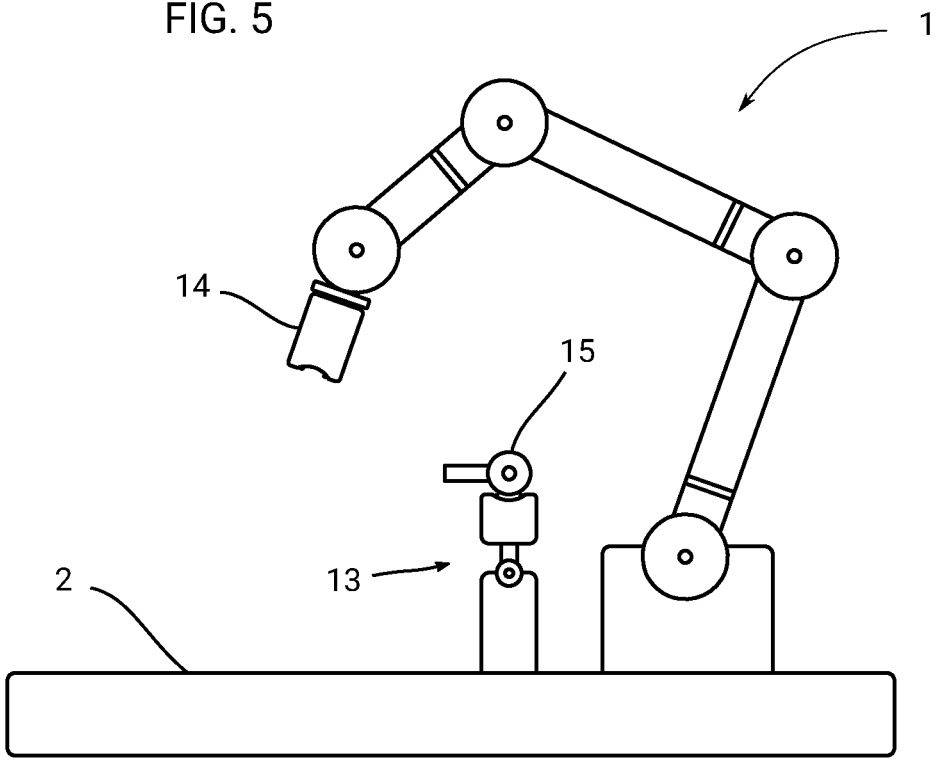
FIGS. 5 to 9 illustrate steps in a method according to a first embodiment of a first aspect of the present invention.

As illustrated in FIG. 5, to begin the procedure, in step S1 the target mount 14 (for supporting the target ball of the ballbar 10) is attached to the flange of the robot arm 1, and in step S2 an adjustable pivot mount 13 (for supporting the pivot ball of the ballbar 10), is positioned in front of the robot on the base 2. The adjustable pivot mount 13 is generally similar to the fixed pivot mount 12 of FIGS. 3 and 4, but differs in that the magnetic cup is adjustable relative to the fixed base 2 (a universal pivot could be used for the pivot mount 13, though it is sufficient if it is adapted just to provide lateral movement or translation). In step S3 the desired TCP and the null base frame in the robot is selected (from various choices of TCP and base frames for different tools and applications). In step S4 a new empty program is created in the robot controller for recording robot coordinates (points) during the remaining procedure.

Figure 6:
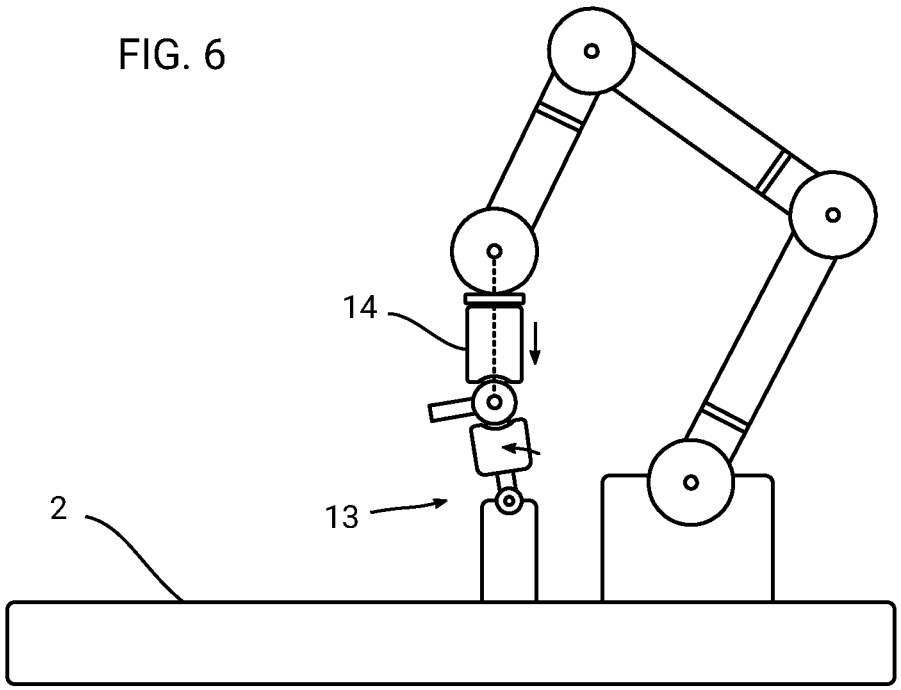

As illustrated in FIG. 6, in step S5 the robot is manually driven to the adjustable pivot mount 13. Prior to step S5, the adjustable pivot mount 13 is still unlocked, with the magnetic cup being loosely supported by a holding force that is sufficient to support the cup against the action of gravity and so that it can still be moved pivotally by a relatively insignificant bias force. In the magnetic cup there is a dummy ball 15 that matches or mimics the pivot ball of the ballbar 10, and in particular is the same size as the pivot ball, to allow the target mount 14 to sit thereon. Since the pivot mount 13 is still unlocked, the target mount 14 does not need to be controlled accurately to a very specific position, but can be driven roughly to within reach of the adjustable pivot mount 13 and moved downwards onto the pivot ball. Even if there is a slight misalignment, the nature of the kinematic cup of the target mount 14 acting on the spherical dummy ball 15 will naturally cause them to couple together in a known relative position, with the play in the pivot mount 13 allowing the movement required for this to occur. As well as being universally pivotable, the pivot mount 13 can also be provided with a play in the Z direction to allow for extra flexibility. The pivot mount 13 could also be non-adjustable, though this would require extra precision in coupling the target mount 14 onto the pivot mount 13 via the dummy ball 15.

With the target mount 14 coupled onto the pivot mount 13 via the dummy ball 15, the adjustable pivot is locked to prevent further movement for the remainder of the method. At this point in the procedure, the exact position of the dummy ball 15 (and therefore the pivot ball of the ballbar 10 when it is put in place) does not matter because the robot coordinates at this position are recorded in the robot program in step S6. So, in step S6, a first point is recorded in the robot program at the current position, i.e. with the robot at the pivot position. This amounts to recording the robot coordinates, or the various encoder readings to enable the robot coordinates to be determined based on the machine model parameters. In this position, since no ballbar is present, a null or zero value for the ballbar measurement is also recorded (at least notionally). In this respect, although no ballbar is present and therefore no separate measurement is actually taken, when the pivot and target points are coincident this effectively provides a zero-length ballbar measurement (i.e. zero in three orthogonal directions, which provides three pieces of information for the error minimisation method, as will be explained in more detail below). The robot coordinates can be considered to be a set of information that fully characterises the machine pose, e.g. a set of joint angles or readings from the various joint encoders).

Figure 7:
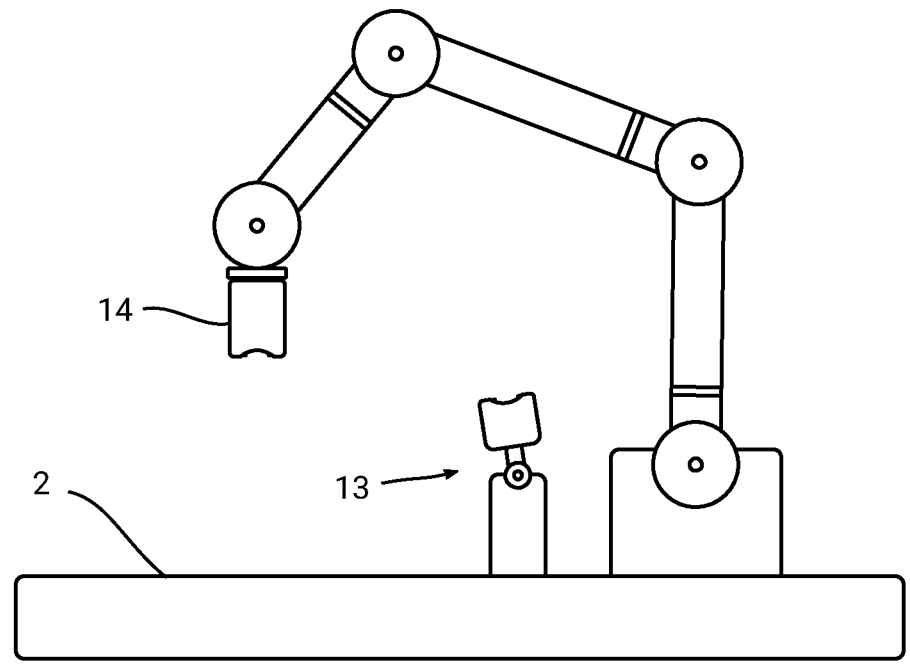
Figure 8:
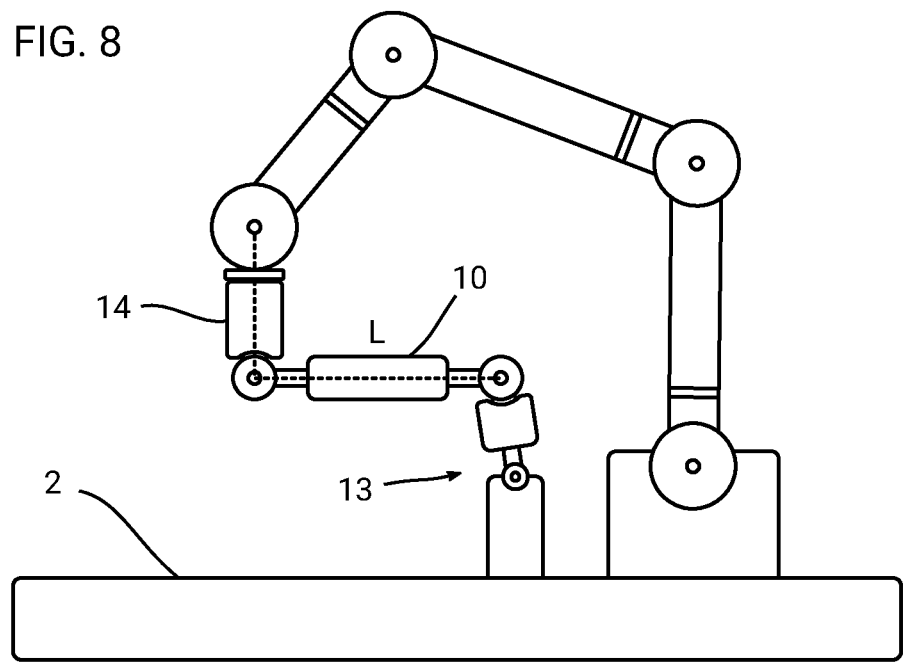

As illustrated in FIG. 7, in step S7 the target mount 14 is moved away from the pivot mount 13 until the separation is sufficient to allow attachment of the ballbar 10. With the ballbar 10 mounted between the target mount 14 and the pivot mount 13, as illustrated in FIG. 8, in step S8 a ballbar measurement (of the separation between the two balls at either end of the ballbar 10) is taken and recorded, and a new point is inserted into the robot program. The point inserted into the robot program comprises the robot coordinates in that position.

In step S9 the robot is commanded to rotate the target mount 14 by e.g. 60° to 90° around the TCP selected in step S3, and in step S10 another point is inserted into the robot program with the robot in the new position. During the rotation, the position of the target mount 14 may deviate (due to errors in the selected TCP values or in the robot itself). If the deviation drives the ballbar 10 out of its measuring range, the user can drive the robot in translation to adjust the distance to bring the ballbar 10 back into its measuring range before a measurement is taken and the robot coordinates recorded.

The method returns to step S9 to repeat the process of rotating the target mount 14 and adding points in the robot program until sufficient rotations have been performed (around at least four principle directions). This is illustrated in FIG. 9. This procedure requires a minimum of four measurements, though usually five or six measurements are better. The more measurements, the more accurate the TCP coordinates will be, but the longer the procedure will take. The measurements can be taken with the ballbar 10 pointing in any direction (not necessarily a fixed direction) but one approach is to command the robot to rotate around the TCP selected in step S3.

When sufficient rotations have been performed, the method continues to step S11, when the robot program is uploaded to the controller (or some other processing unit) for processing. In step S12, the coordinates of the TCP selected in step S3 are input, read from the robot program if already recorded in there. In step S13, the error minimisation method referred to above is performed, in order to compute the actual TCP coordinates. This is explained in more detail below with reference to FIG. 11. As part of the process, the coordinates of the pivot centre are also determined, though this information is of lesser interest because the pivot mount 13 is only in place temporarily anyway. In step S14 the TCP coordinates are updated in the controller with the updated values.

Figure 11:
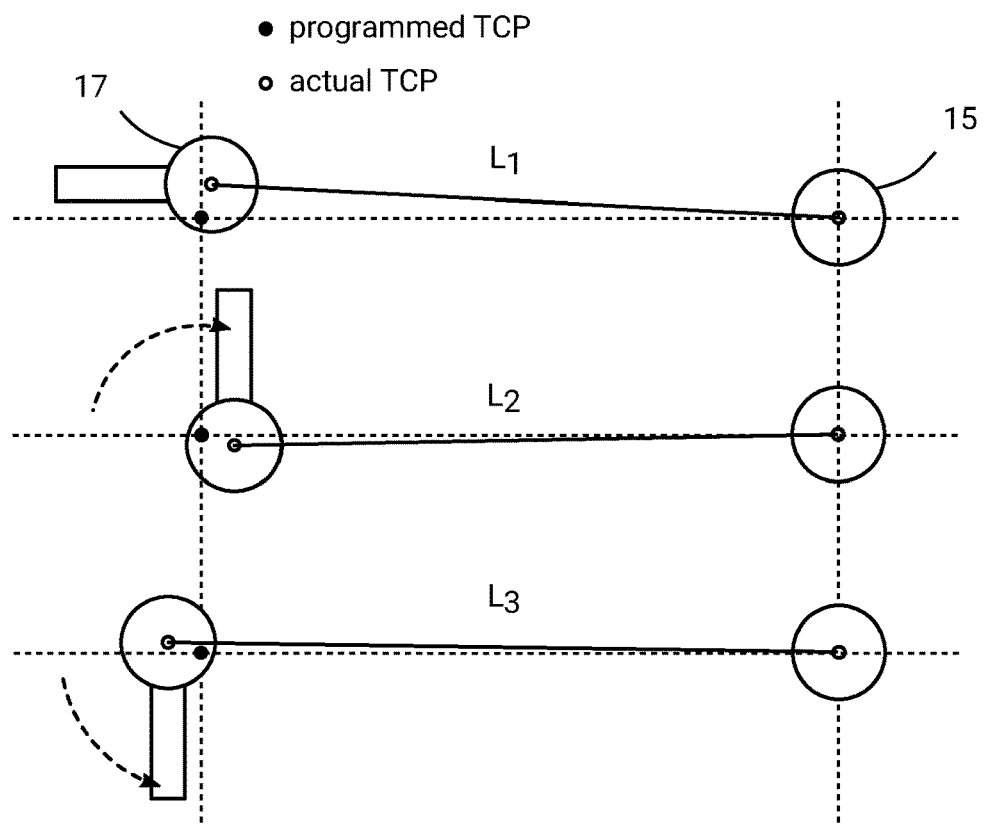
FIG. 11 is a schematic illustration of how an incorrect TCP position affects measurements from the method.

FIG. 11 is a schematic illustration of the effect that an incorrect TCP position has on the measurements from the ballbar 10 during the above procedure, and how these are used to determine the correct TCP position. The target ball 17 of the ballbar 10 (as driven by the robot) is on the left, while the pivot ball 15 is on the right, with the ballbar 10 in between (the ballbar 10 is depicted for simplicity as a solid line in FIG. 11). The programmed TCP (i.e. the TCP before the TCP identification procedure has been performed) is illustrated as a black dot on the target ball, with the physical centre of the target ball (i.e. the actual TCP) illustrated as a white dot on the target ball.

In the example of FIG. 11, the robot is driven around the programmed TCP, attempting to maintain a fixed position for the TCP (this is not required, but it makes the present explanation more straightforward). With the robot in the position according to the top-most illustration, the ballbar 10 produces a measurement of $L_1$. Then the robot is rotated to the position according to the middle illustration. Because the programmed and actual TCPs do not coincide, the new measurement L2 from the ballbar 10 is actually smaller than $L_1$. Similarly, when the robot is rotated to the position according to the lower-most illustration, the new measurement $L_3$ from the ballbar 10 is actually larger than both $L_1$ and $L_2$. If the programmed TCP were already correct, it would instead have been expected that all three measurements $L_1$, $L_2$ and $L_3$ are the same. Instead, there is an error associated with each of these positions (the difference between the expected and actual ballbar measurements). Therefore, a new value for the TCP position is determined that would tend to minimise these errors, and this is by way of the error minimisation method mentioned above.

For the approach described above with reference to FIGS. 5 to 11, it is only required to record the position of the robot (i.e. the robot coordinates) for each ballbar measurement, as well as the position of the robot (i.e. the robot coordinates) at the pivot point. This is technically advantageous compared to the first and second approaches described respectively with reference to FIGS. 3 and 4, because it combines the benefit of the first approach (small number of measurements) with the benefit of the second approach (robustness and ease of configuration with no need for inputting the ballbar direction). The method is very straightforward to perform and teach, offering quick and easy setup procedure for ballbar tests on robots. It can also be used to update or check the TCP coordinates in the controller.

As mentioned above, the concept underlying the first aspect of the present invention can be summarised as using the robot coordinates at the position of the pivot as input for the mathematical method (e.g. least squares or maximum likelihood) used to determine the TCP. This is not done with previously-considered techniques. With the robot at the pivot position, there is of course no ballbar in place and therefore apparently no measurement from the ballbar to associate with the robot coordinates at that position. However, at the pivot point there is effectively a zero-length measurement from ballbar to associate with the robot coordinates. In addition, this zero-length measurement can be considered as one that is effective along three orthogonal axes, rather than just one axis which is the case for an actual ballbar measurement (i.e. along the longitudinal axis of the ballbar). Therefore, this notional zero-length ballbar measurement is particularly beneficial in the error minimisation routine by providing at least three additional constraints.

Although it is described above that the method uses a single ballbar direction with a minimum of four TCP orientations (i.e. four different orientations of the ballbar around the TCP), using five makes it more complete and more straightforward to implement and teach. However, it should be noted that, using fewer TCP orientations is actually possible, but there are certain problematic situations which might arise which are avoided when using at least four TCP orientations (unless irrelevant rotations are made, for example so that the ballbar 10 remains in a plane). It is also noted that the ballbar 10 is preferably itself already calibrated; otherwise at least one additional measurement is required in the method.

It is also worth considering eventual errors coming from the robot itself. In the above procedure, it is assumed that the robot is ideal (or accurately calibrated), even when in practice it is not. In the unlikely event where the actual robot errors in all four or five measurements would compensate the deviations due to TCP errors, the method might conclude that the TCP is correct. In fact, it can be considered that the method does not identify the actual TCP but rather the TCP as seen by the ballbar in the specific configuration of the test. The TCP identified will tend to reduce the local errors of the robot. This is the case for any method, as any calibration strategy should take care of dissociating all parameters. The eventual errors coming from the robot are more a question of overall machine calibration strategy.

It will also be appreciated that the technique described above is not limited to the specific task of identifying the tool centre point of a robot, but is in fact applicable to robot geometry identification in general.

The concept can be summarised as using the robot coordinates at the position of the pivot as data for robot geometry identification, not only TCP identification, or even more generally to machine geometry identification (i.e. not limited to robots, e.g. a five-axis coordinate measuring machine). This is valid for any calibration with any sensor that measures ball to ball distances (e.g. ballbar, tripod, hexapod, etc.). This will identify the position of the ball attached to the robot flange (wherever it is). If this ball is aligned with the actual end effector, this will identify the coordinates of the TCP (as described above). The TCP identification procedure is just one application of the concept, and has been described as one example to help understand the advantages of the concept, which are to simplify and speed up the TCP identification by reducing the number of measurements and user input required.

It is also noted that, for the TCP identification procedure (unlike for a simple tool orientation test), it is not necessary to rotate around a fixed point, and merely necessary to provide a number of different orientations around the TCP regardless of the position of the TCP. On the other hand, the tool (or TCP) orientation test is to check that the robot geometry is correct, in which the robot is commanded to rotate around a fixed point and the ballbar deviations are measured during this process. If the robot was perfect, the ball would not move and there would be no deviation. Any geometrical error in the robot will result in the ball moving and the ballbar reading changing. The result of the test is the width or spread of the deviations. This is just a verification, not a calibration. The geometrical errors can be any error in the arm itself or errors in the TCP coordinates.

The concept is also not limited to measurement using a ballbar, and any distance measuring device would be suitable (e.g. a measuring arm, tripod). The concept can be extended further by considering that a "separation" can be one-dimensional (just a distance between two points) or it can be considered to be two-dimensional or anything up to six-dimensional. In other words, the "separation" can relate to a separation in anything from one degree of freedom to six degrees of freedom. For example, a six-dimensional separation would characterise not only the relative distance between two entities but also their orientation relative to one another. A traditional ballbar would measure separation in one degree of freedom (along the line between two points) but a tripod can measure a separation in three degrees of freedom and a hexapod can measure a separation in six degrees of freedom. The term "separation" used herein is to be interpreted accordingly.

From a calibration point of view, the position of the tool centre point (relative to the robot to which the tool is attached) and the position of the pivot can both be considered as machine parameters that are to be optimised as part of a method embodying the present invention. At the start of the error minimisation method, there will be a current estimate of the tool centre point (for example from the manufacturer of the tool, or from a previous calibration of the tool's TCP), and the goal of the method is to find a new (better) estimate for the TCP. In this respect, the TCP position can be considered to be just like any other machine parameter from a calibration point of view, with different TCP parameters being tried during the optimisation in order to find a "best fit" to the measurements from the ballbar (or other measurement device). If the current estimate of the TCP position is wrong, then this will manifest itself in a difference or error between a separation as measured by the measurement device (e.g. ballbar) and what is expected (calculated) based on the current TCP position. The mathematical optimisation procedure will attempt to find a better estimate of the TCP position that results in a smaller error value (or difference between what has been measured and what is calculated from the parameters).

This is similar for the pivot position. Any reasonable starting point can be used for the position of the pivot position. If the target point is placed coincident with the pivot point for the initial "pivot" reading (as described above), then it is known that the separation between the target point and the pivot point should be zero (in all three orthogonal directions, thereby providing three extra constraints). However, the current machine parameters may actually put the target point in a different location to the current estimate for the pivot point (so that there is a separation between them of greater than expected, i.e. greater than zero). That difference between the position of the target point as determined from the current machine parameters and the current guess for the pivot point can be treated as an error value (or values) just like any other error value (or values) in the machine calibration method. It is similar if, rather than there being a zero separation (where the target is placed at the pivot), there is a known offset or separation from the pivot and target for the initial "pivot" reading. All of these error values, both from actual separations and from the inferred separations, are used in the optimisation method. By running the optimisation, this will result in a better estimate both of the TCP position (which is what is most useful) and of the pivot position (which is of less interest).

Figure 52A:
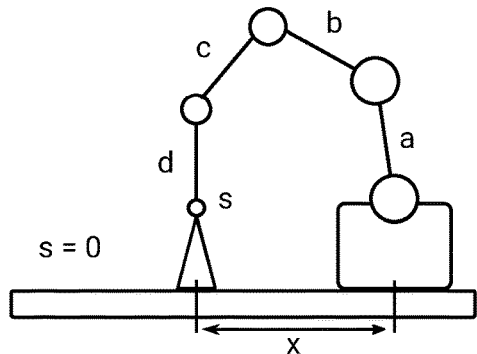
Figure 52B:
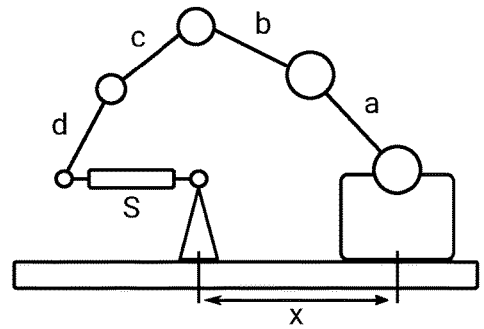
Figure 53A:
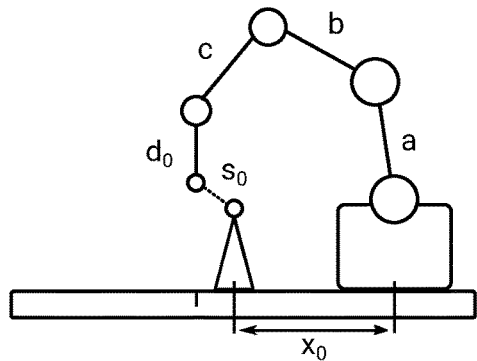
Figure 53B:
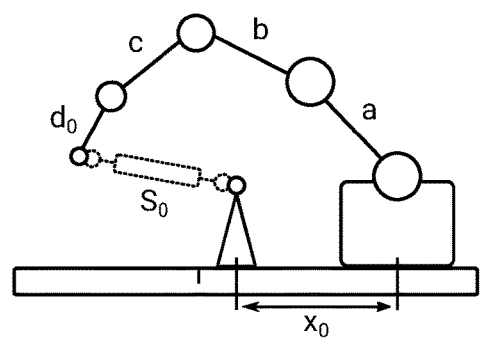
Figure 54A:
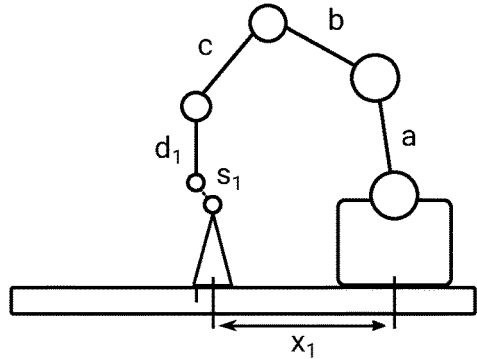
Figure 54B:
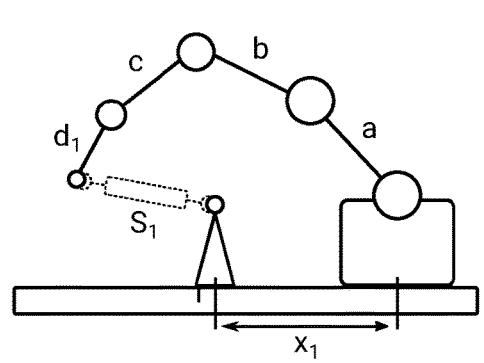

This is illustrated schematically in FIGS. 52 to 54. FIGS. 52A, 53A and 54A illustrate the machine in a pivot pose, while FIGS. 52B, 53B and 54B illustrate the machine in a target pose. The machine is illustrated schematically as being characterised by the set of machine parameters {a, b, c, d, x} where {a, b, c} are the respective lengths of the articulated sections, 'd' is the length of the tool and 'x' is the x coordinate of the pivot relative to the base of the machine. Therefore, 'd' is a TCP parameter and 'x' is a pivot parameter. Of course, this example is highly simplified and not to be understood literally, because there would be many more machine parameters in practice; there will also be more than one target pose used.

FIGS. 52A and 52B represent the state of the machine as it actually is when at the pivot pose and target pose respectively. The actual separation between the target and the pivot is known to be 's' when in the pivot pose; in the embodiment described above, this separation is zero (i.e. the target is arranged to be coincident with the pivot). The actual separation between the target and the pivot is measured to be 'S' in the target pose (by the ballbar or other measurement device). It can be seen that the various parameters {a, b, c, d, x, s} or {a, b, c, d, x, S}, i.e. including the separation 's' or 'S' respectively, form a closed metrology loop for the machine.

FIGS. 53A and 53B represent the state of the machine as determined from the current set of machine parameters when at the pivot pose and target pose respectively. The current machine parameters are $\{a, b, c, d_0, x_0\}$, where $x_0 < x$ and $d_0 < d$. In other words, the current estimates for parameters {d, x}, i.e. the TCP and pivot parameters, are incorrect. For the purposes of this method, the other machine parameters {a, b, c}, i.e. those other than the TCP and pivot parameters, are assumed to be correct (or at least remain constant for the method).

The expected separation between the target and the pivot, based on the current set of machine parameters, is calculated to be '$s_0$' when in the pivot pose (FIG. 53A), and '$S_0$' when in the target pose (FIG. 53B). There is, therefore, a difference between the actual and expected separations, and based on those differences, associated errors $e_0$ and $E_0$ for the pivot and target poses respectively can be determined, and in turn an overall error $\Sigma_0$ associated with the current set of machine parameters $\{a, b, c, d_0, x_0\}$.

In order to find a parameter set that is a better fit to the measured/known data, an optimisation is performed in which the parameters {d, x} are perturbed in order to find new parameters $\{d_1, x_1\}$ that give a lower overall error $\Sigma_1$, while leaving the other parameters {a, b, c} alone. This is illustrated schematically in FIGS. 54A and 54B, where it can be seen that the new estimate of the pivot parameter '$x_1$' is closer to the actual pivot parameter 'x', and the new estimate of the TCP parameter '$d_1$' is closer to the actual TCP parameter 'd', with the separations '$s_1$' and '$S_1$' likewise being closer to the known/measured values 's' and '5' respectively. This optimisation can be repeated as many times as is required, for example until the overall error $\Sigma$ falls below a predetermined threshold. The direction in which the parameters are perturbed can be based on derivatives. At each step in the optimisation, whilst the tendency is for individual errors to decrease, some individual errors may increase while others decrease, with the aim being for the overall error to decrease (though it is also possible that the overall error might increase if this would result in larger potential error decreases later in the method). Of course, any suitable optimisation method may be used, such as the least-squares approach or the maximum likelihood approach mentioned previously.

By way of comparison, of the two methods described with reference to FIGS. 3 and 4 respectively, the first relies on the direction of the ballbar 10 only and the position of the pivot is not used at all. The second considers the position of the pivot as a machine parameter but it does not use the measurement at the position of the pivot as data for the calibration. Therefore, it requires more ballbar measurements. In both a method embodying the present invention and the second method (FIG. 4), the TCP and the position of the pivot are determined in the end.

The method can be considered to be a calibration method based on optimising a full set of machine parameters, including parameters relating to the TCP and to the position of the pivot. If enough readings are taken then this could result in a full calibration of the machine including e.g. parameters relating to the rotary joints and section lengths, and so on. However, it is beneficial to consider a method in which just a subset of the full set of machine parameters is optimised. In other words, the full parameter set is still used in the method, but only some of them are actually optimised (i.e. new values are determined for only some of them). The other parameters are treated as fixed, i.e. notionally "correct" and are not considered for varying during the error minimisation (or similar) method. To calibrate just the TCP position, therefore, only the TCP machine parameters are varied in order to determine a TCP parameter set that fits the measurements (both actual and notional) better. This results in fewer measurements being needed, and therefore results in a quicker calibration procedure.

A second embodiment of the first aspect of the present invention will now be described with reference to FIGS. 12 to 26. This also constitutes a first embodiment of the second aspect of the present invention.

Figure 12:
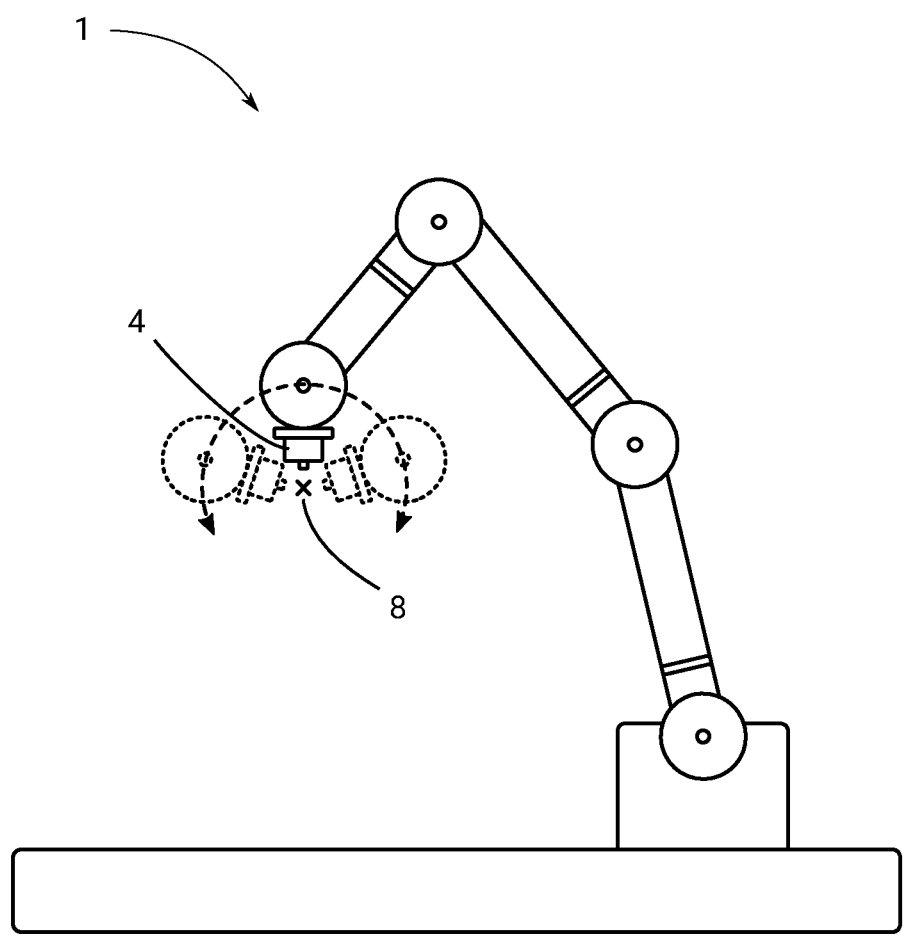
FIG. 12 is similar to FIG. 2 but showing a welding tool having a tool centre point that is offset from the tool itself.

FIG. 12 is similar to FIG. 2, showing a tool being rotated by the robot around its tool centre point, but to simplify the subsequent explanation, in FIG. 12 the tool 4 is depicted schematically as a welding tool having a tool centre point that is offset from the tool itself, though this is not essential for the purposes of the second aspect.

FIG. 13 schematically illustrates a TCP identification procedure being performed as described above, differing from FIG. 9 only in that a fixed pivot 12 is illustrated rather than an adjustable pivot (though the adjustable pivot of FIG. 9 could instead be used, as described below). As illustrated in FIG. 14, a drawback with the method of the first embodiment of the first aspect is that it requires the actual tool 4 to be removed and a ballbar mount 14 to be attached instead (or for a modified ballbar mount to be attached in addition to and offset from the tool 14). Not only is this inconvenient and time-consuming for the operator, but the nominal centre of ballbar mount 14 will be offset from the actual TCP of the tool 4, as illustrated schematically in FIG. 15, so that an adjustment will have to be made; this leads to further complication and possible sources of error.

As illustrated schematically in FIG. 16, the second aspect of the present invention introduces a ball adaptor 24 which is adapted to fit over the tool 4, and which allows the tool 4 to remain in place during the TCP identification procedure. The ball adaptor 24 has a spherical (or at least part-spherical) bearing surface 20 that is adapted to couple to a modified ballbar (see below), and a sleeve 22 that is adapted to fit snugly over the tool 4 and to remain in place for example via a friction fit. The spherical bearing surface 20 has a centre 28 that, when the ball adaptor 24 has been fully inserted and located onto the tool 4 (the right-most part of FIG. 16), coincides with a point of interest of the tool 4. In this example, the point of interest is the tool centre point 8 of the tool 4, but in another example the tool centre point 8 of the tool 4 may lie in a different place to the point of interest around which the spherical bearing surface 20 is provided.

The illustration of FIG. 16 is only intended to illustrate the concept schematically, and it will be appreciated that an appropriately-designed coupling between the ball adaptor 24 and the tool 4 can be used to ensure that the centre 28 of the ball adaptor 24 coincides reliably with the point of interest (e.g. tool centre point) 8 of the tool 4 when the user places the ball adaptor 24 onto the tool 4. One such example is described below with reference to FIGS. 27 to 30.

A TCP identification method according to the second embodiment of the first aspect and first embodiment of the second aspect will now be described briefly with reference to FIGS. 17 to 26. The method is very similar to that described above in relation to the first embodiment of the first aspect, so for the sake of brevity the explanation will focus on the similarities and differences.

Figure 17:
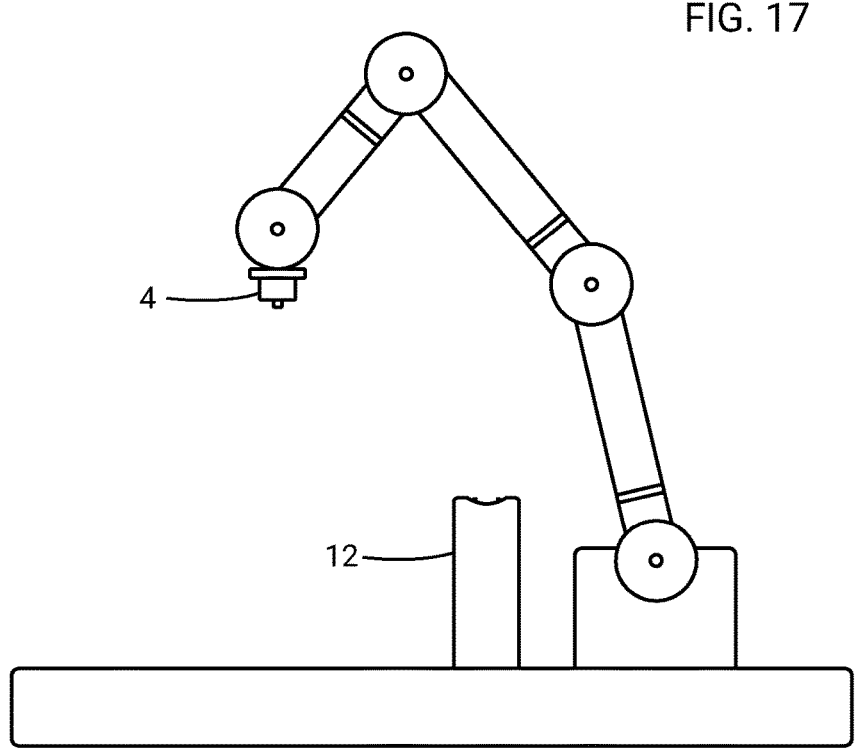
Figure 18:
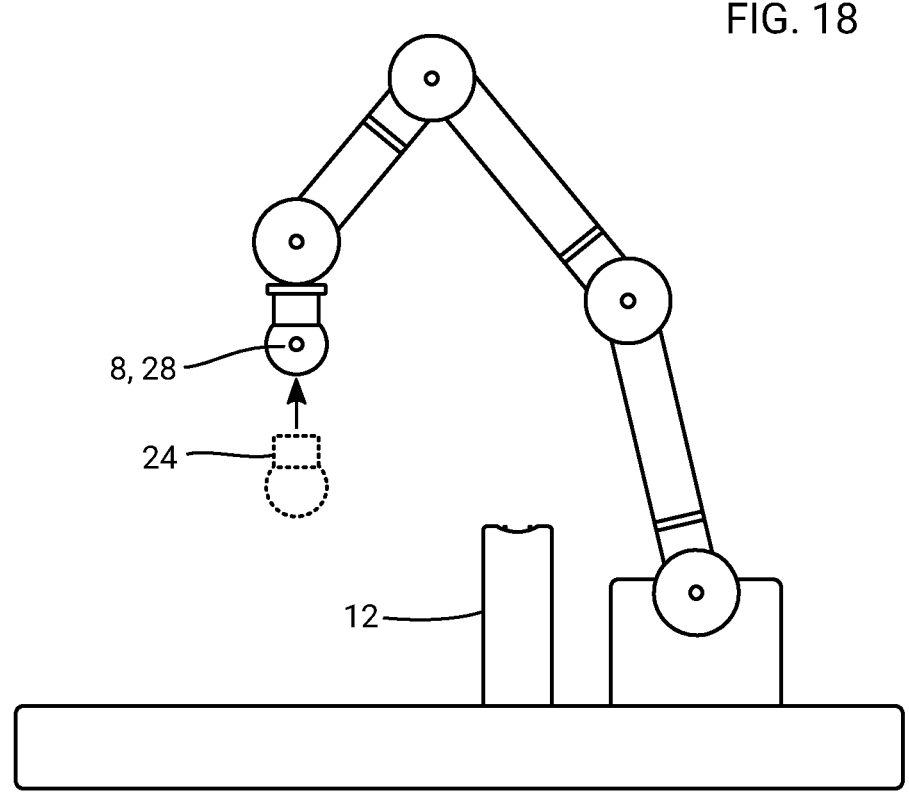

The starting point for this embodiment is shown in FIG. 17, which is equivalent to FIG. 5 discussed above. Of course, in this embodiment the tool 4 remains in place on the robot, rather than the ballbar mount 14 of FIG. 5. In addition, as mentioned above, a fixed pivot mount 12 is used, though the adjustable pivot mount 13 of FIG. 9 would be preferable. FIG. 18 illustrates the ball adaptor 24 being attached over the tool 4, to provide a ball centre 28 that coincides with the TCP 8 of the tool 4.

Figure 19:
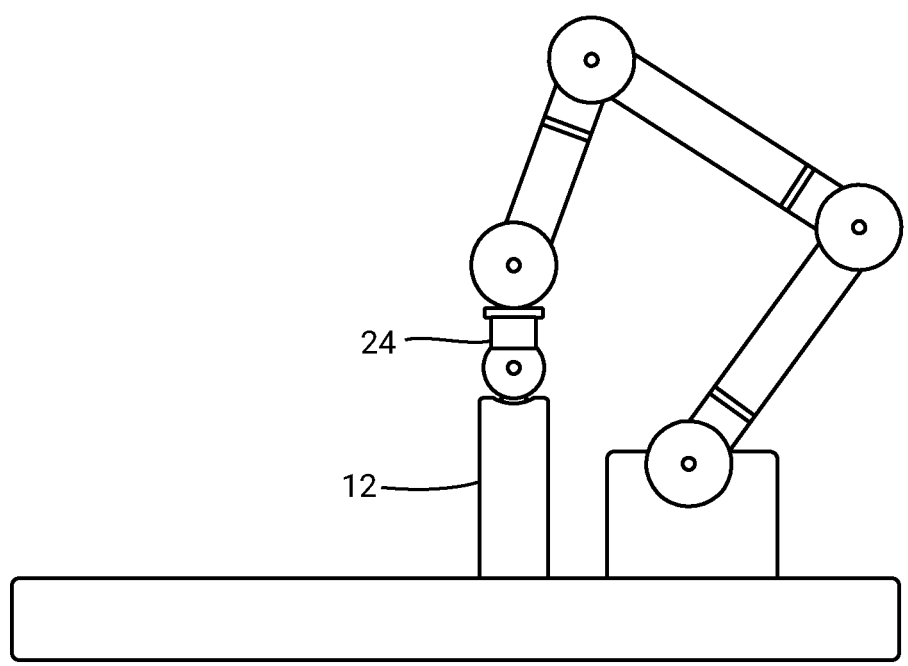

FIG. 19 shows the robot being controlled to move the ball adaptor 24 onto the pivot mount 12, which is equivalent to what is illustrated in FIG. 6. With a fixed pivot 12 the robot would need to be controlled with high accuracy to align the ball adaptor 24 onto the fixed pivot mount 12, which is why it is preferable to use an adjustable pivot mount 13 instead. However, the dummy ball 15 of FIG. 6 is not required because the spherical target ball is provided by the ball adaptor 24 itself. As with the previous embodiment, the robot coordinates are recorded with the robot in this position, i.e. at the pivot point.

Figure 20:
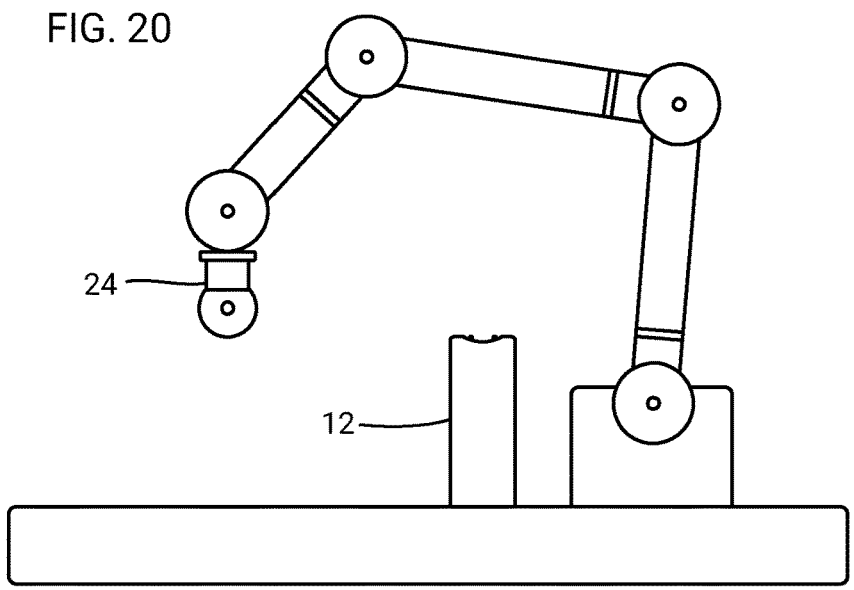
Figure 21:
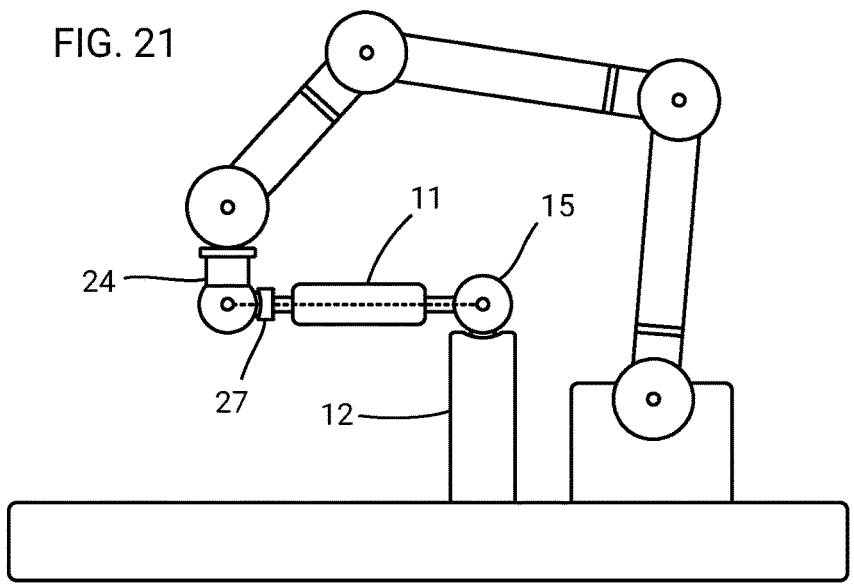

FIG. 20 shows the robot being controlled to move the ball adaptor 24 away from the pivot mount 12, to make way for the ballbar, which is equivalent to what is illustrated in FIG. 7. FIG. 21 illustrates a ballbar 11 being positioned in place between the ball adaptor 24 and the ballbar mount 12, which is equivalent to FIG. 8. However, the ballbar 11 of this embodiment differs from that shown in FIG. 8 because the target ball 17 of the earlier ballbar 10 is now provided by the ball adaptor 24 itself. Therefore, the target end of the ballbar 11 in this embodiment is provided with a magnetic cup 27, similar to that which forms part of the pivot mount 12, which couples against the ball adaptor 24. The pivot ball 15 is present on both types of ballbar, but note that the pivot ball 15 of ballbar 11 should be sized so as to match the size (diameter) of the spherical surface of the ball adaptor 24. These two types of ballbar are compared in FIGS. 22A and 22B. As with the previous embodiment, in this embodiment the robot coordinates and ballbar measurement are recorded in this position.

FIGS. 23 to 26 illustrate the robot being controlled to place the ball adaptor 24 in four additional different orientations respectively (though three would have been sufficient), equivalent to what is shown in FIG. 9. As with FIG. 9, the various orientations would not be within the same plane, but would instead provide some variation in three dimensions away from a single plane. Also note that, with the various positions of the ballbar 11 in FIGS. 21 and 23 to 26, the robot is not attempting to maintain the TCP 8 of the tool 4 in the same position in space, because as mentioned before, this is not necessary.

Like the method of the first aspect of the present invention, the use of a ball adaptor 24 according to the second aspect of the present invention makes the procedure for finding the TCP more straightforward than without. Since the process of identifying TCP coordinates is at a lower level of robot calibration, compared to a full calibration of the robot, a TCP identification procedure will be welcome to the user only if it is fast and easy to implement. This encourages the user to perform the procedure more frequently, which in turn leads to a more accurately-performing machine.

Figure 27:
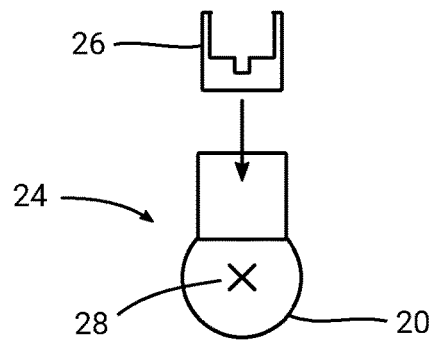
Figure 28:
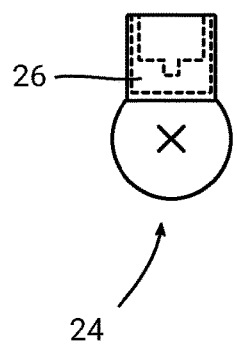
Figure 29:
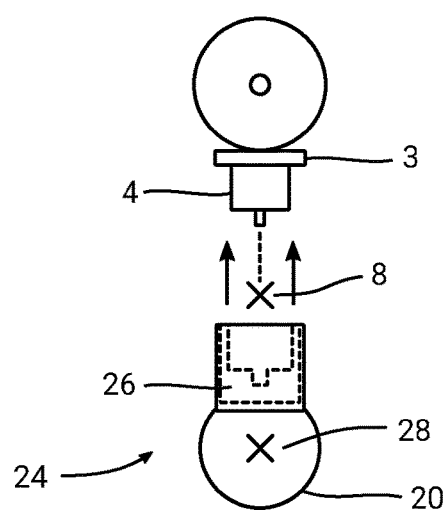

The ball adaptor concept as described above can be made even more convenient and flexible by providing a generic ball adaptor that can be used for a variety of different tools. This can be achieved by customising an insert for different tools, with each insert fitting into the generic ball adaptor. Of course, a number of different types or sizes of generic ball adaptor can be provided to suit different types or groups of tools. The inserts can conveniently be 3D printed from a variety of different materials, for example plastic, depending on the application. This is illustrated in FIGS. 27 to 30. FIG. 27 shows a generic ball adaptor 24 which is adapted to receive an insert 26 which is itself shaped internally to conform to a welding tool such as that depicted in FIG. 16. When inserted into the ball adaptor 24, as illustrated in FIG. 28, the insert 26 can be held in place by a friction fit, or additional securing features may be provided. Then, the ball adaptor 24, with insert 26, is placed onto the tool 4 as illustrated in FIG. 29. Because the insert 26 is designed in this example to be a snug fit to the tool 4, the operator can simply push the ball adaptor 24 onto the tool 4 until it comes to a stop, and will know that the ball adaptor 24 is then properly located relative to the tool 4, and in particular so that the ball centre 28 coincides with the TCP 8 of the tool 4. A gap can be provided between the ball adaptor 24 and the flange 3 of the robot so that the position of the ball adaptor 24 relative to the tool 4 will be defined by the coupling between the ball adaptor 24 and the tool 4 rather than between the ball adaptor 24 and the flange 3 (although in many cases the ball adaptor 24 will anyway not cover all of the tool 4 but only the tip of the tool 4; such an example is described below with reference to FIG. 55). Mounting directly on the tool 4 has the advantage of quick setup and not introducing eventual errors from the ball adaptor 24 not seating exactly in place of the tool 4.

Figure 30:
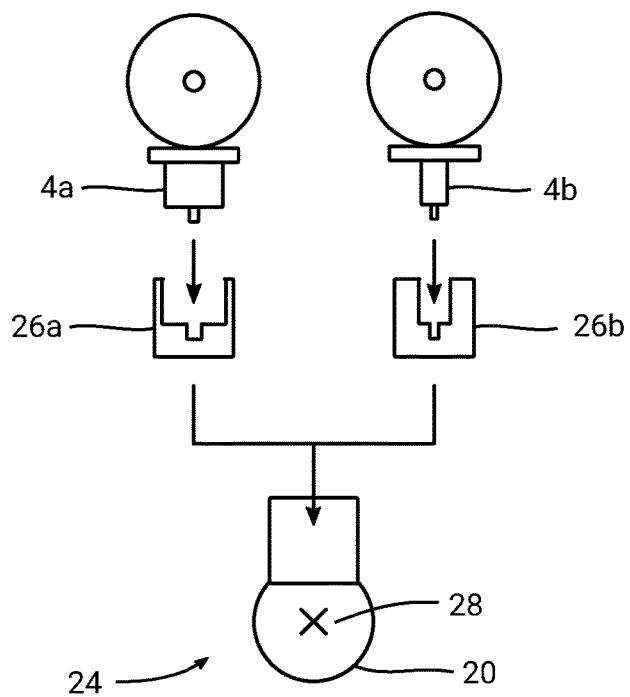

The modularity of such a system is depicted schematically in FIG. 30, which shows two different designs of insert 26a, 26b to suit two different respective types of tool 4a, 4b, with both designs of insert 26a, 26b fitting into the same ball adaptor 24. The different inserts 26a, 26b can be designed to account for the different respective TCP locations of the different tools 4a, 4b to ensure that the TCP is coincident with the centre of the spherical surface 20 of the ball adaptor 24 when everything is in place. In this way, the same ball adaptor 24 can be used for a variety of tools 4 having quite different configurations and TCP locations.

This versatility is further illustrated by the application shown in FIGS. 55A and 55B, which show a custom insert 26c which is shaped to fit the end of a drill 4c mounted on a machine spindle 9, with the insert 26c fitting into the same ball adaptor 24 (or it could be a different ball adaptor for example of a different size). The insert 26c is adapted to account for the TCP location of the drill 4c to ensure that the TCP is coincident with the centre 28 of the spherical surface 20 of the ball adaptor 24 when everything is in place.

As illustrated in FIG. 56A, a calibration shaft 4d could be fitted to the machine instead of the drill 4c itself, with an insert 26 allowing the shaft 4d to fit into a wider recess in the ball adaptor 24, with the wider recess thereby being able to accommodate a variety of calibration shafts (or other tools) of different diameters. Alternatively, since the use of an insert 26 provides a potential extra element of positional uncertainty (in terms of centring the ball adaptor 24 on the tool 4), as shown in FIG. 56B it is also possible to do without an insert 26 and instead to fit the calibration shaft 4d directly into a recess formed in the ball adaptor 24, with the recess again being adapted to account for the TCP location of the shaft 4d to ensure that the TCP is coincident with the centre 28 of the spherical surface 20 of the ball adaptor 24.

A method involving the ball adaptor 24 and calibration shaft 4d is illustrated in FIGS. 57A and 57B, showing how the removable ball adaptor 24 can be placed onto the calibration shaft 4*d* when required (e.g. to perform a TCP calibration method as described previously) and then removed in order to perform another operation, all without having to remove the calibration shaft 4*d*. In the example shown in FIGS. 57A and 57B, the further operation is to establish the position of a laser tool setter (such as the NC-4 non-contact tool setter manufactured by Renishaw plc), since the length of the calibration shaft 4*d* is already known. FIG. 57A schematically illustrates the ball adaptor 24 being removed from the shaft 4*d*, with the shaft 4*d* then being maneuvered by the machine towards a laser beam 66 of the tool setter 60, with the laser beam 66 being emitted from a transmitter element 62 and received (and detected) by a receiver element 64. FIG. 57B schematically illustrates the shaft 4*d* just intersecting the laser beam 66, thereby blocking it from reaching the receiver element 64, so that the end of the shaft 4*d* is thereby detected. Instead of the calibration shaft 4*d*, such a method can be performed directly on the drill 4*c*, allowing the actual length of the drill 4*c* to be measured using the tool setter 60, without the drill 4*c* having to be removed. The laser tool setter 60 can of course instead be employed before the TCP calibration, if desired.

An example of how an insert such as that shown in FIG. 55 locates into and secures onto the ball adaptor 24 is illustrated in FIG. 58. The ball adaptor 24 is hollow, having a bore or recess 25 that is accurately centred with the surface 20 of ball 24. A resilient (e.g. plastic) insert 26*c* slip-fits into the bore 25, with a conical contact 23 between the ball 24 and the insert 26*c*. The ball 24 is fastened on the insert 26*c* via a tightening screw 29, so that the conical contact 23 forces the insert 26*c* to tighten on the tool 4*c*, gripping it and holding it in position. The inner bore or recess 25 of the insert 26*c* can be shaped to centre the ball 24 on any point of the tool 4*c*, not necessarily on its tip. The insert 26*c* can be made with a cylindrical recess to adapt on most common artefacts, but in specific cases the insert 26*c* can also be made to fit the actual shape of the tool 4*c*, as illustrated in FIG. 55A. FIG. 59 illustrates how the ball 24 can be screwed directly onto the end of the calibration shaft 4*d* of FIG. 56, thus securing it in place without the need for the conical surface 23 of FIG. 58, though that such a mechanism could be employed as well.

In summary, whenever it is required to measure the position of a robot for the purpose of verification or calibration, the measurement only makes sense if it can be related to the actual working point of the robot. This is a key issue with most measurement devices as they require to position a physical interface at the location of the point which required to be measured; furthermore, the robot's TCP is often on or very close to the physical element of the tool. Hence, prior to the solution described herein, the only choice was either to remove the robot's tool and replace it with the measurement device or to mount the measurement device at some known offset from the actual TCP. Both solutions lead to measurement uncertainty and/or require special care in setup.

A ball adaptor such as that proposed herein, that would mount on the tool of a robot without altering it and that would enable direct measurement of the position of the TCP, enables quick and efficient robot calibration.

As set out above, the TCP of the robot is materialised with a ball mechanically centred on the point that is to be measured. The main source of uncertainty for this solution is the quality of the centring; it mainly depends on the manufacturing quality of the ball.

Measurement devices can connect to the ball with a magnetic adaptor that ensures accurate coincidence of the measured point with the ball centre. The accuracy depends on the manufacturing quality of the connector and the sphericity of the ball. The magnetic adaptor can sit on the ball with three points or with a cone, thereby providing a repeatable kinematic or pseudo-kinematic coupling. A three-point contact is 'metrologically pure', but a cone is able to step over small grooves or holes in the ball; this allows special features in the ball to ease machining operations. A cone also generates smaller constraints at the contact points with the ball.

When the TCP is on or very close to the physical element of the tool, the ball is made hollow (centred on the TCP) to place it 'around' the final element of the tool. The solution uses a deformable insert that matches the shape of the tool. For example, the insert can be screwed into the hollow ball and can activate a cone on cone mechanism that forces the insert to tighten on the tool (see FIG. 58).

It is possible to provide universal inserts that mount on tools with a main cylindrical feature. There would be inserts ready for the diameters mostly used in industry (e.g. 10 mm to 20 mm) or make diameter reducers could be made with one single universal insert of the larger diameter.

Where a universal insert cannot be used, it is possible to produce specific inserts that match any tool shape, which could be 3D printed from a CAD (computer aided design) model of the insert.

Where the TCP is far enough from the tool final element, the hollow ball enables the TCP to be materialised with a simple shaft of the appropriate length. For example, in the case of machining applications whose TCP is the tip of the cutting tool, a plain shaft can be mounted into the spindle. After calibration the shaft can be left on and used to initialise a tool setter, providing calibration continuity between the calibration shaft and the cutting tool.

The ball adaptor is mainly described above as being fitted onto and/or around a working tool, but the adaptor can be fitted onto and/or around any element of or associated with the coordinate positioning machine or a tool attached thereto. For example, a large gripper e.g. for handling door parts in a car manufacturing plant may comprise a plurality of cylindrical calibration elements at different locations on the gripper, for the purpose of calibrating the position of the tool frame of the gripper. A ball adaptor as described herein could be fitted onto each of these cylindrical calibration elements in turn, with a calibration method as described herein (e.g. with reference to FIGS. 19 to 26) then being performed. Each of the cylindrical calibration elements has a point of interest (e.g. at the centre of the circular end surface thereof) and the ball adaptor (or insert for the ball adaptor) would be adapted such that the centre point of the ball adaptor substantially coincides with the point of interest. The point of interest in this example is not a tool centre point as such, because the cylindrical calibration element is not a tool as such. It is also the case that the tool centre point of the gripper does not correspond to any single point on the gripper, but rather is likely to be defined at some offset from that, for example in a tool frame of reference which includes the car door as held by the gripper.

The at least part-spherical bearing surface 20 of the ball adaptor 24 can also be referred to as a sensing surface 20, because it is a surface that is sensed by the measuring device (e.g. ballbar) 11. The sensing surface 20 (at least in complete form, i.e. as a complete sphere) surrounds or encapsulates the point of interest (e.g. tool centre point) 8, effectively allowing the point of interest to be sensed or probed or measured from a variety of different directions. The sensing surface 20 (at least in complete form, i.e. as a complete sphere) also surrounds or intersects at least part of the element (e.g. tool) 4, so that it is possible to place the ball adaptor 24 centred on the point of interest 8 only if the ball adaptor 24 is hollow, with a hole or bore or recess that make rooms for the body of the tool 4. This is in contrast with the sensing surface of the probe 46 shown in FIG. 23 of U.S. Pat. No. 5,297,238, which is a planar disc with a limited extent that is sensed by a planar digitizing plate, and which does not surround the point of interest (which is the tip of the tool 43) or intersect with the tool 43.

With the ball adaptor 24, each point on the sensing surface 20 is substantially equidistant from the point of interest (e.g. TCP) 8 of the element (e.g. tool 4) to which the ball adaptor 24 is attached, when the adaptor 24 is in place. The measurement point of the measuring device (e.g. ballbar) 11 is substantially coincident with the point of interest (e.g. TCP) 8 at all times during a measurement operation. In this way, the measuring device (e.g. ballbar) 11 is effectively "addressing" the point of interest (e.g. TCP) 8 directly, almost as if the measuring device (e.g. ballbar) 11 is connected directly to the point of interest (e.g. TCP) 8. This is not the case with the arrangement of FIG. 23 of U.S. Pat. No. 5,297,238, where the sensing point (origin) of the probe 46 cannot be in the same position as the tip of the tool 43, with it only being possible instead to put it along the same line as the tool tip at an offset therefrom. With the hollow ball adaptor 24 embodying the present invention, these issues are solved by making the two points substantially coincident. Furthermore, with the hollow ball adaptor 24 embodying the present invention, measurements can be taken by the measuring device (e.g. ballbar) 11 from a variety of different angles (allowing machine movements during a measurement operation in a variety of degrees of freedom), whereas with the arrangement of FIG. 23 of U.S. Pat. No. 5,297,238 measurements are made with the probe 46 at a fixed angle relative to the planar digitizing plate.

In an embodiment of the second aspect of the present invention, the measuring device comprises a coupling element which is adapted to couple to and bear against the bearing surface of the adaptor such that a measurement point of the measuring device is substantially coincident with the centre point of the adaptor, with the centre point of the adaptor in turn being substantially coincident with the point of interest of the machine element to which the adaptor is attached. The ball adaptor thereby acts to bring these three different points together: the measurement point of the measuring device; the centre point of the ball adaptor; and the point of interest of the tool. This provides a huge technical benefit when attempting to measure and/or calibrate the position of the point of interest, for the reasons outlined above. FIG. 22B provides an example of a measurement device in the form of a ballbar 11, with a coupling element in the form of a cup 27, and shows the location of a measurement point 18 of the measuring device 11 at the centre of a spherical bearing surface (or spherical surface passing through a plurality of bearing points) of the cup 27; the measuring device 11 has a second measurement point 16 at the centre of the ball 15 at the other end, with the measuring device 11 providing a measure of the separation between the two measurement points 16, 18.

A first embodiment of the third aspect of the present invention will now be described with reference to FIGS. 31 to 36. This can be used in conjunction with the first and/or second aspect of the present invention.

FIG. 31 illustrates a ballbar 10 attached between a first ballbar mount 12 fixed to the base 2 of the machine (the "pivot" for the ballbar 10) and a second ballbar mount 14 attached to the robot itself. In use, the ballbar 10 will be driven around the working volume of the machine, for example to perform a procedure described above with reference to FIG. 3 or 4, or a procedure according to the first or second embodiments of the first aspect of the present invention. It is also likely that the robot will be driven manually by an operator, using a joystick.

Some types of ballbar, whilst being extremely accurate, have a limited range of travel and some have an even more limited range of measurement (for example a 2 mm range of travel and a 1 mm range of measurement), as illustrated in FIG. 32. With the types of robot movement described above, some of which may be extreme and under human control, the use of such ballbars for robot applications can be problematic. In particular, there is a risk that an attempt will be made to extend the ballbar 10 beyond its normal range of travel, with the consequent risk that the ballbar 10 will become detached (if over extended) or damaged (if over compressed). The third aspect of the present invention aims to address this problem.

Figure 33:
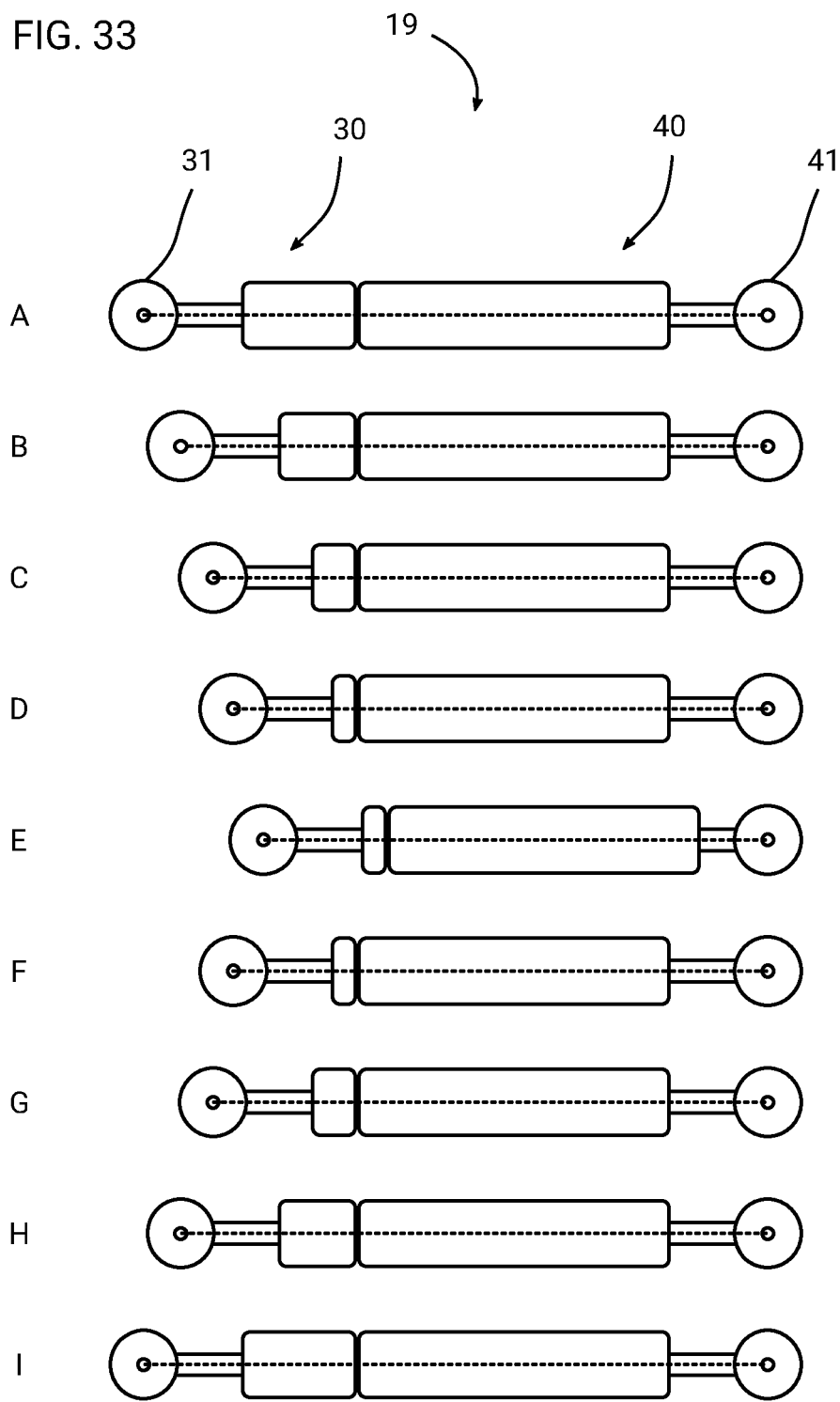

FIG. 33 schematically illustrates a first embodiment of the third aspect of the present invention. The solution is to provide a modular ballbar 19 having a measurement part 40, having a ball 41, that is adapted to provide length measurements, onto which can be attached either a standard part (not shown) or an extension part 30, including its own ball 31. In this embodiment, the extension part 30 provides an extra range of travel, but not measurement. In configuration A of FIG. 33, the ballbar 19 is already over-extended, beyond its normal measurement range, with the extension part 30 in an extended state. As the ballbar 19 is gradually compressed from configuration A to D of FIG. 33, the extension part 30 takes up the compression, with the measurement from the ballbar 19 not changing. From configuration D to E, the extension part 30 is fully compressed (unable to take any further compression) and the ballbar 19 enters its measurement range, in which measurements are taken (this is indicated by the compression at the other end, by ball 36). When the ballbar 19 is extended again, from configuration E to F, it is still within its measurement range but reaches the extreme of its measurement range in configuration F. Then, from configuration F to I the ballbar 19 is again in the extension range, where the extension part 30 is extending, and where the measurement from the ballbar 19 is not changing.

Figure 34:
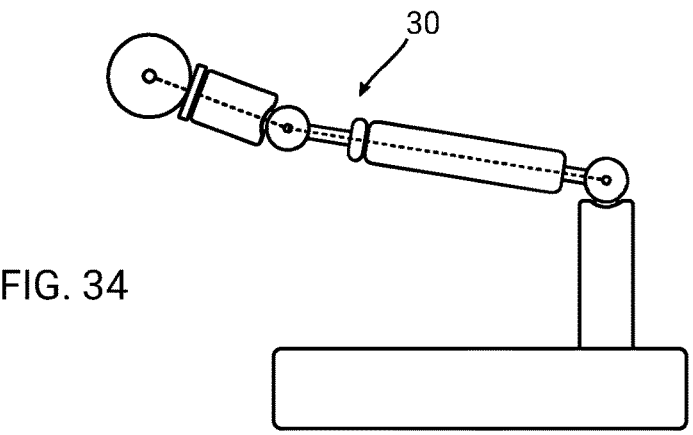
Figure 35:
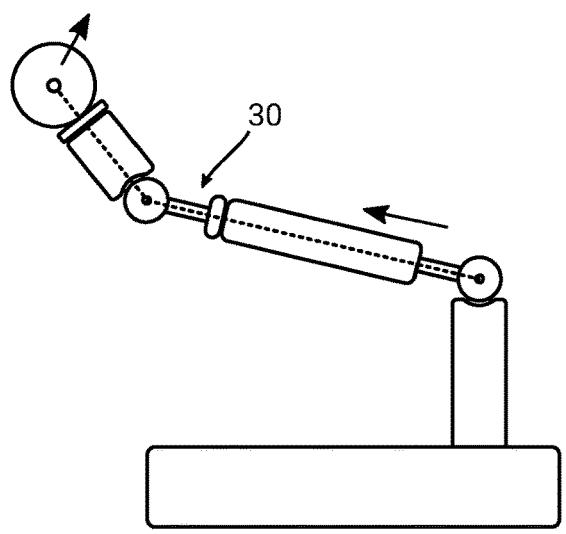
Figure 36:
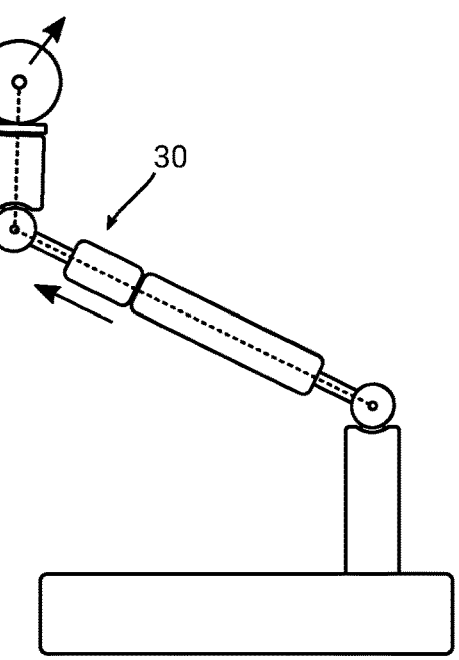

FIGS. 34 to 36 illustrate schematically the ballbar 19 with extension piece in use on a robot. In FIG. 34, the ballbar 19 is at the extreme of its measurement range (fully compressed), corresponding to configuration E of FIG. 33. In FIG. 34, the ballbar 19 is extending, and still operating within its measurement range, to move to the other end of it measurement range, corresponding to configuration F of FIG. 33. Finally, in FIG. 36 the ballbar 19 is extending beyond its measurement range and into its overtravel range, corresponding to configurations G to I of FIG. 33. Advantageously, in FIG. 36 the ballbar 19 does not become detached from the ballbar mount 14 at one end or the pivot mount 12 at the other, due to the operation of the extension part 30.

With the extension part 30 of FIG. 33, there is effectively an overtravel region to one side of a measurement region, which allows for over-extension but not over-compression. It is also possible for the extension part 30 to provide an overtravel region or buffer on either side of the measurement region, as will be described below with reference to FIGS. 37 to 50, which relates to a second embodiment of the third aspect of the present invention.

FIG. 37 illustrates a modular ballbar 19 with a measurement part 40 connected to a standard part 50, i.e. without the extension part 30 yet in place. The standard part 50 has a ball 51 to provide one ball of the ballbar 19, while the other ball is provided by ball 41 of the measurement part 40. The measurement part 40 comprises a resilient (e.g. spring) member 46 arranged between a fixed plate 42 and a moveable plate 43, with the ball 41 being fixed to the moveable plate 43. The moveable plate 43 is itself arranged between stops 44 and 45 (with stop 45 being provided by an end wall of the measurement part 40). The measurement part 40 may be adapted to provide measurements by capacitive means, i.e. using a capacitive sensor, but any type of measurement method is possible.

As shown in FIG. 37, the ballbar 19 (and more specifically the measurement part 40 of the ballbar 19) is in the middle of its measuring range. FIG. 38 shows the ballbar 19 at one extreme of its measuring range (fully compressed, with plate 43 seated against stop 44), while FIG. 39 shows the ballbar 19 at the other extreme of its measuring range (fully extended, with plate 43 seated against stop 45).

Figure 40:
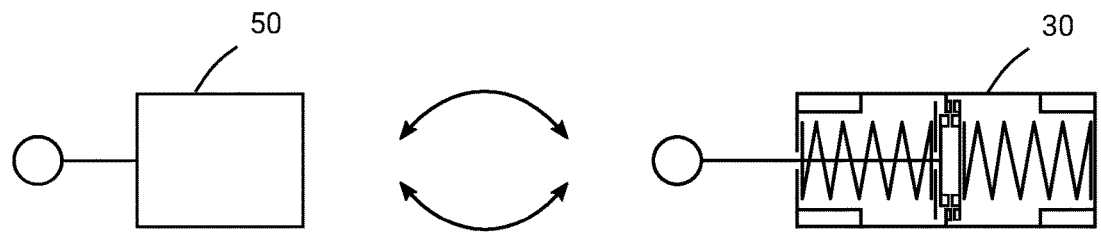
Figure 41:
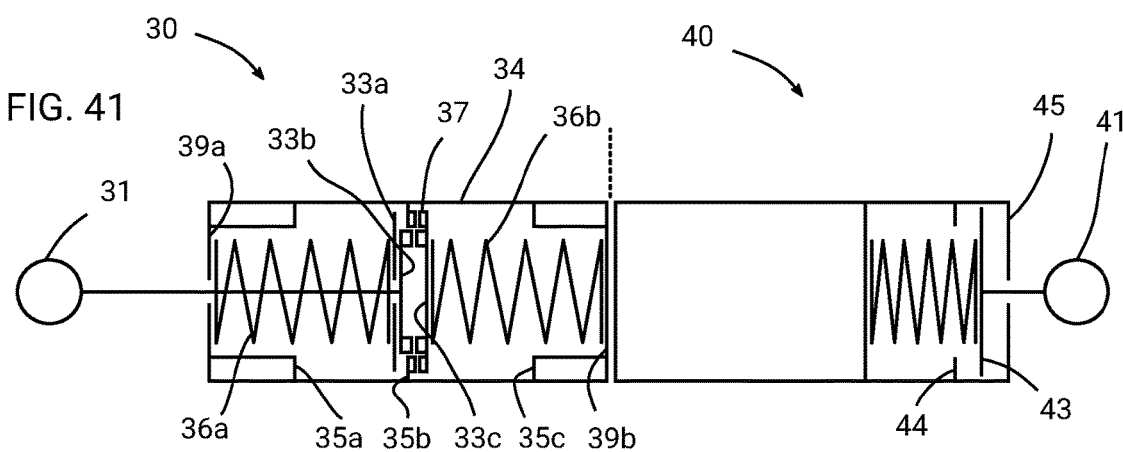

FIG. 40 illustrates the standard end part 50 being swapped for the extension part 30. The assembled ballbar 19, with the extension part 30 coupled releasably to the measurement part 40, is illustrated in FIG. 41. As illustrated in FIG. 41, the extension part 30 in this embodiment has a ball 31, three moveable plates 33a, 33b, 33c, three stops 35a, 35b, 35c, two resilient (e.g. spring) members 36a, 36b, and a plurality of magnets 37. The second plate 33b is connected to and moves with the ball 31, the first spring 36a is arranged between end wall (stop) 39a of the housing 34 and first plate 33a, and the second spring 36b is arranged between the other end wall (stop) 39b of the housing 34 and third plate 33c.

In the position as shown in FIG. 41, the second and third plates 33b, 33c are seated against one another and held by magnets 37 to each other and to second stop 35b. The moveable plate 43 of the measurement part 40 is in the middle of the measuring range of the measurement part 40, so any compression or extension of the ballbar 19 in this state will cause a change in the measured value. The ballbar 19 is therefore operating within its measuring range, with the extension part being seated.

Figure 42:
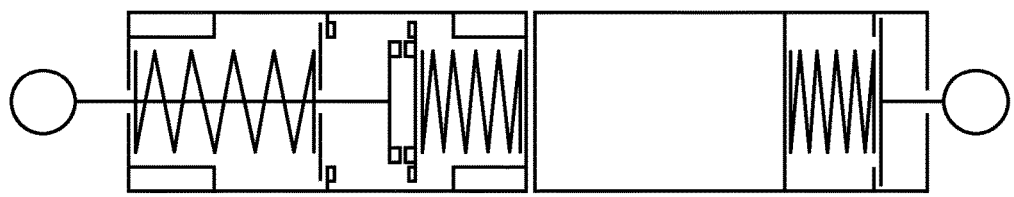

FIG. 42 shows what happens when the ballbar 19 is compressed beyond a point where plate 43 comes up against stop 44. The second plate 33b of the extension part 30 pushes against third plate 33c, against the bias of second spring member 36b, to separate third plate 33c from the magnetic attraction of the second stop 35b, and to allow both plates to move within the extension part 30 and in turn to allow the ball 31 to move towards the ball 41. This allows the extension part 30 to absorb the extra compression, without damage to the measurement part 40, and provides a greater range of travel to the ballbar 19. The measurement output from the ballbar 19 does not change.

Figure 43:
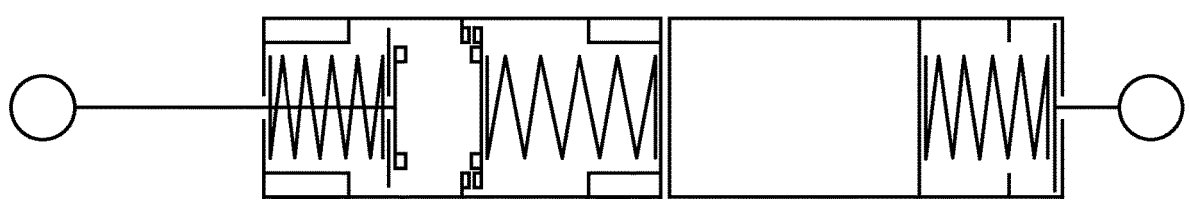
Figure 44:
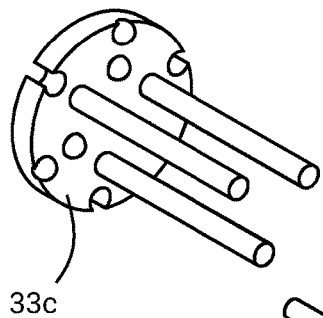
Figure 45:
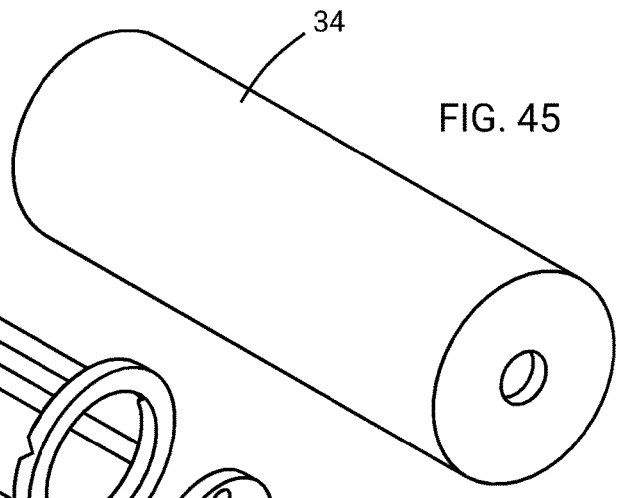

FIG. 43 shows what happens when the ballbar 19 is extended beyond a point where plate 43 comes up against stop 45. Second plate 33b of the extension part 30 pushes against first plate 33a, against the bias of first spring member 36a, and becomes separated from the magnetic attraction of the third plate 33c, which itself is held against the second stop 35b. This allow both plates 33a, 33b to move within the extension part 30 and in turn to allow the ball 31 to move away from ball 41. This allows the extension part 30 to absorb the extra expansion, without damage to the measurement part 40, and provides a greater range of travel to the ballbar 19. The measurement output from the ballbar 19 does not change.

Figure 47:
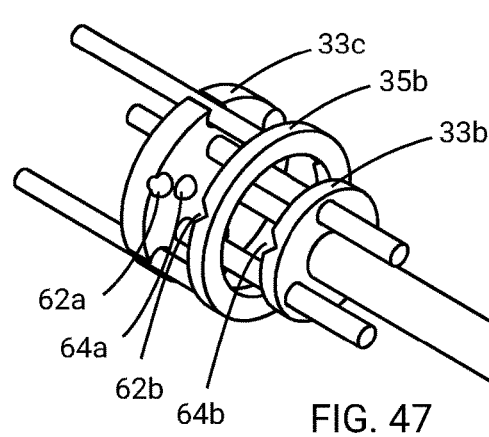
Figure 46:
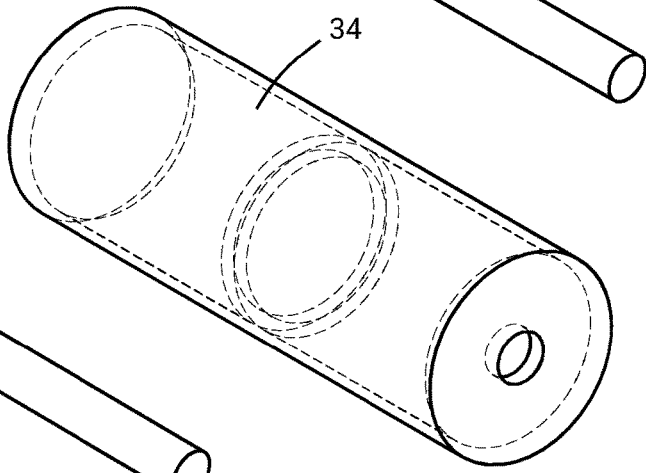
Figure 49:
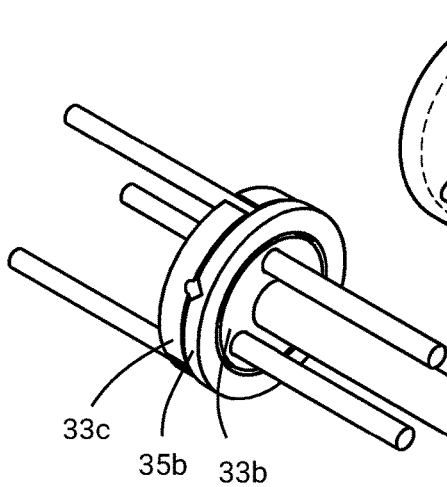
Figure 48:
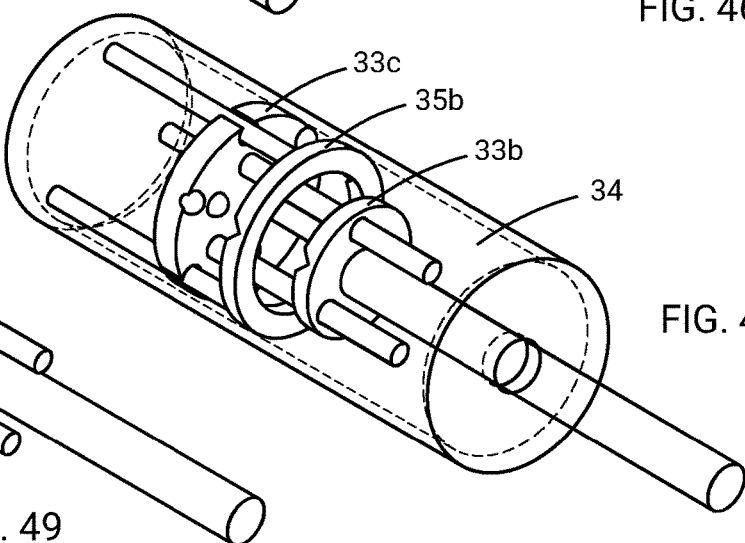
Figure 50:
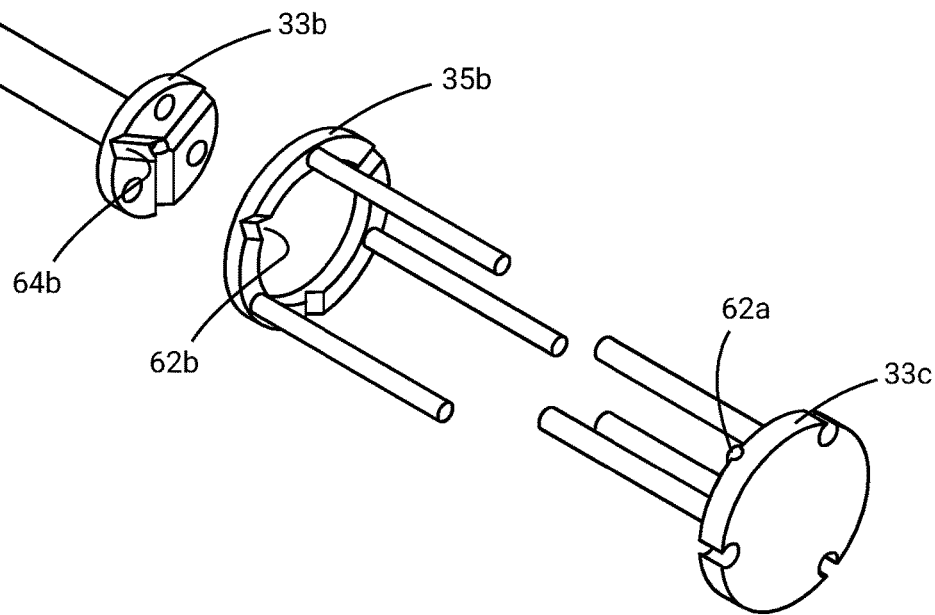

FIGS. 44 to 49 are perspective views showing key parts of the extension part 30, which are the housing 34, the third plate 33c, the second stop 35b and the second plate 33b. Other elements are not shown for the sake of clarity, and to avoid clutter. Second stop 35b is fixed to housing 34. FIG. 50 is a perspective view corresponding to that in FIG. 44, but from an opposite direction. Also marked in FIGS. 47 and 50 are kinematic coupling features 62a and 62b (balls and v-grooves respectively) which ensure the precise and predictable coupling between the third plate 33c and the second stop 35b, as well as kinematic coupling features 64a and 64b (balls and v-grooves respectively) which ensure the precise and predictable coupling between the second plate 33b and the third plate 33c.

It will be appreciated that each of the above-described first to third aspects of the present invention are independently applicable, and can be used separately or in any combination. For example, the extension piece of the third aspect can be used with the ball adaptor of the second aspect, as is illustrated schematically in FIG. 51. In FIG. 51, it can be seen that the extension part 30 of the modular ballbar 19 is provided with a cup 27 rather than a ball 31, so that the cup 27 can couple with the ball adaptor 24 on the robot.

It will also be appreciated that the ball adaptor of the second aspect need not always be used in conjunction with a TCP identification method of the first aspect, and will also find uses in other applications. Similarly, the extension piece of the third aspect is not limited to use in such a method of the first aspect or with the ball adaptor of the second aspect, but will be useful more generally. The ball adaptor of the second aspect need not always be used in conjunction with a ballbar as the measuring device, but could for example be used in conjunction with a tripod-based measuring device.

A machine controller for controlling the operation of the robot (or other type of coordinate positioning machine) is also provided. The machine controller may be a dedicated electronic control system and/or may comprise a computer operating under control of a computer program. For example, the machine controller may comprise a real-time controller to provide low-level instructions to the coordinate positioning machine, and a PC to operate the real-time controller.

Figure 1:
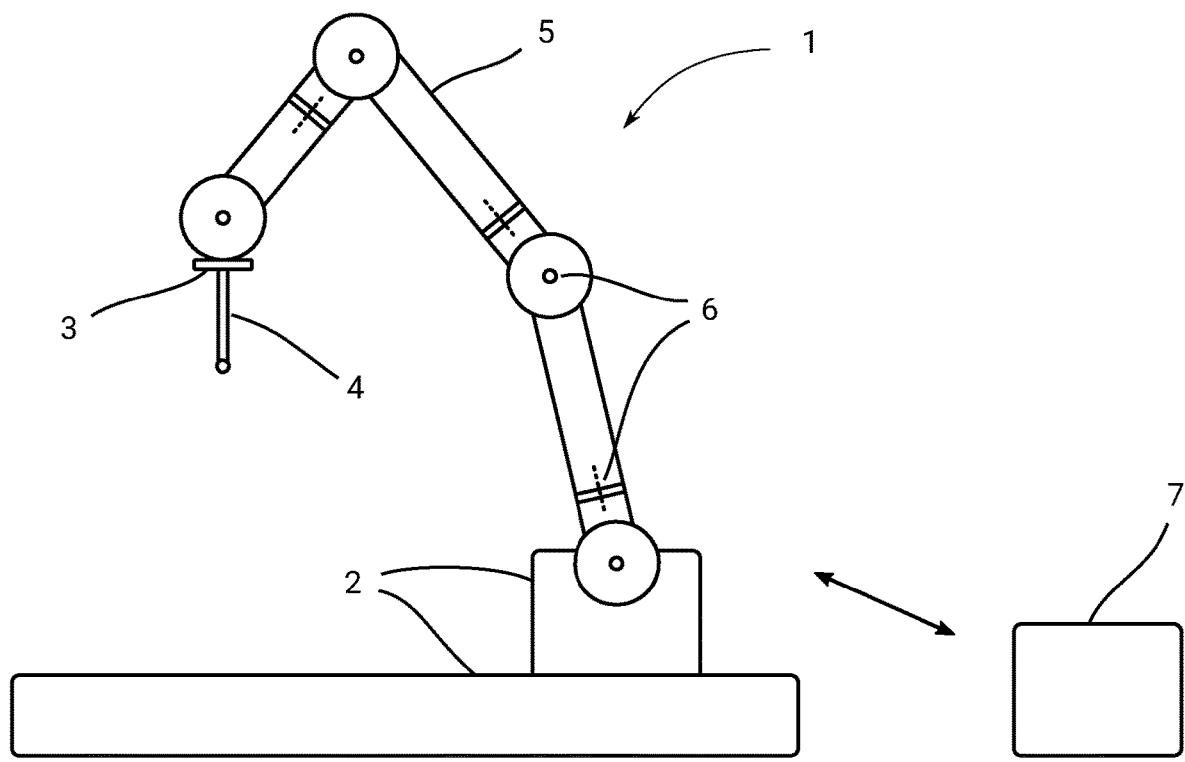

It will be appreciated that operation of the coordinate positioning machine can be controlled by a program operating on the machine, and in particular by a program operating on a coordinate positioning machine controller such as the controller illustrated schematically in FIG. 1. Such a program can be stored on a computer-readable medium, or could, for example, be embodied in a signal such as a downloadable data signal provided from an Internet website. The appended claims are to be interpreted as covering a program by itself, or as a record on a carrier, or as a signal, or in any other form.

The invention claimed is:

1. A method of calibrating a coordinate positioning machine, a geometry of the machine being characterized by a parametric model and the calibration method being intended to determine a new set of model parameters that characterizes the geometry of the machine better than an existing set of model parameters, the method comprising:
   controlling the machine into a pivot pose in which a target point associated with a moveable part of the machine and a pivot point associated with a fixed part of the machine are separated from one another by a known separation;

determining an error value for the pivot pose based on the known separation and a separation expected for the pivot pose from the existing set of model parameters;

controlling the machine into a plurality of different target poses;

for each target pose, (i) measuring a separation between the target point and the pivot point and (ii) determining an error value for that target pose based on the measured separation and a separation expected for that target pose from the existing set of model parameters;

determining an overall error measure from the error values; and determining a new parameter set that would result in a lower overall error measure than for the existing set of model parameters.

2. The method as claimed in claim 1, further comprising:
determining a new set of error values based on the new parameter set; and
from the new set of error values determining a newer parameter set.

3. The method as claimed in claim 1, wherein the known separation is a null vector, with the target point and the pivot point being substantially coincident in the pivot pose.

4. The method as claimed in claim 1, further comprising determining a new value for only a subset of the existing set of model parameters.

5. The method as claimed in claim 4, wherein the subset of the existing set of model parameters relates to a tool center point of the machine.

6. The method as claimed in claim 1, wherein the separation is measured by a length-measuring device such as a ballbar.

7. The method as claimed in claim 1, wherein the coordinate positioning machine is a robot.

8. The method as claimed in claim 1, further comprising:
taking a kit comprising a measuring device and an adaptor,
the adaptor being configured to fit onto and/or around an element, the element having a point of interest, and the adaptor comprising an at least part-spherical bearing surface having a center point that, when fitted onto and/or around the element, substantially coincides with the point of interest, and
the measuring device comprising a coupling element that is configured to couple to and bear against the bearing surface of the adaptor such that a measurement point of the measuring device is substantially coincident with the center point of the adaptor and remains so as the coupling element moves over at least a predetermined or working part of the bearing surface;

fitting the adaptor onto and/or around the element;

with the element still on the coordinate positioning machine, coupling the measuring device to the adaptor so that the coupling element of the measuring device bears against the at least part-spherical bearing surface of the adaptor; and performing a measurement operation such that during the measurement operation the measurement point of the measuring device is coincident with the center point of the adaptor and remains so as the coupling element of the measuring device moves over at least the predetermined or working part of the bearing surface of the adaptor.

9. The method as claimed in claim 8,
wherein the element is a tool, and
wherein the point of interest is a tool center point of the tool.

10. The method as claimed in claim 8, wherein the adaptor is configured to receive a plurality of different inserts in a generic manner, with the inserts being adapted to receive different respective elements or types of element, thereby enabling the adaptor to be used with a variety of different elements or types of element.

11. The method as claimed in claim 10, wherein each insert is shaped internally to match an external shape of its corresponding element.

12. He method as claimed in claim 10, wherein each insert is adapted to account for a location of the point of interest of its corresponding element to ensure that the point of interest is substantially coincident with the center of the bearing surface of the adaptor when fitted onto and/or around the element.

13. The method as claimed in claim 8, wherein the measuring device is adapted to provide a measurement of a separation between two measurement points of the measurement device.

14. The method as claimed in claim 8, wherein the measuring device is a length-measuring device such as a ballbar.

15. The method as claimed in claim 8,
wherein the adaptor is configured to receive a plurality of different inserts in a generic manner, with the inserts being adapted to receive different respective elements or types of element, thereby enabling the adaptor to be used with a variety of different elements or types of element, and
wherein the kit comprises the inserts.

16. A coordinate positioning machine configured to perform the method as claimed in claim 1.

17. A non-transitory computer-readable medium having stored therein computer program instructions for controlling a computer or a machine controller to perform the method as claimed in claim 1.

* * * * *